US008725854B2

(12) United States Patent
Edsall et al.

(10) Patent No.: US 8,725,854 B2

(45) **Date of Patent: *May 13, 2014**

(54) METHODS AND APPARATUS FOR IMPLEMENTING VIRTUALIZATION OF STORAGE WITHIN A STORAGE AREA NETWORK

(75) Inventors: Thomas James Edsall, Cupertino, CA (US); Silvano Gai, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 986 days.

This patent is subject to a terminal disclaimer.

(21) Appl. No.: 12/199,678

(22) Filed: Aug. 27, 2008

(65) Prior Publication Data

US 2008/0320134 A1 Dec. 25, 2008

Related U.S. Application Data

(63) Continuation of application No. 10/056,238, filed on Jan. 23, 2002, now Pat. No. 7,433,948.

(51) Int. Cl.

| | |
|---|---|
| ***G06F 15/173*** | (2006.01) |
| ***G06F 15/16*** | (2006.01) |
| ***G06F 21/00*** | (2013.01) |

(52) U.S. Cl.

USPC ................................ 709/223; 709/246; 711/6

(58) Field of Classification Search

USPC ...................................... 709/223, 246; 711/6

See application file for complete search history.

(56) References Cited

U.S. PATENT DOCUMENTS

| | | | |
|---|---|---|---|
| 5,617,421 | A | 4/1997 | Chin et al. |
| 5,740,171 | A | 4/1998 | Mazzola et al. |
| 5,742,604 | A | 4/1998 | Edsall et al. |
| 5,764,636 | A | 6/1998 | Edsall |
| 5,809,285 | A | 9/1998 | Hilland |
| 5,859,960 | A | 1/1999 | Kurihara et al. |
| 5,878,232 | A | 3/1999 | Marimuthu |
| 5,933,824 | A | 8/1999 | DeKoning et al. |

(Continued)

FOREIGN PATENT DOCUMENTS

| | | |
|---|---|---|
| JP | 1008433 | 1/1989 |
| JP | 02-144718 | 6/1990 |

(Continued)

OTHER PUBLICATIONS

ISR mailed Mar. 11, 2005 from corresponding PCT Application No. PCT/US 2003/00883.

(Continued)

*Primary Examiner* — Ranodhi Serrao

(74) *Attorney, Agent, or Firm* — Novak Druce Connolly Bove + Quigg LLP

(57) ABSTRACT

Methods and apparatus for implementing storage virtualization on a network device of a storage area network are disclosed. A frame or packet is received at a port of the network device. It is then determined that the frame or packet pertains to access of a virtual storage location of a virtual storage unit representing one or more physical storage locations on one or more physical storage units of the storage area network. A virtual-physical mapping between the one or more physical storage locations and the virtual storage location is then obtained. A new or modified frame or packet is then sent to an initiator or a target specified by the virtual-physical mapping.

50 Claims, 14 Drawing Sheets

(56) References Cited

U.S. PATENT DOCUMENTS

| | | | | |
|---|---|---|---|---|
| 5,999,930 | A | 12/1999 | Wolff | |
| 6,035,105 | A | 3/2000 | McCloghrie et al. | |
| 6,101,497 | A | 8/2000 | Ofek | |
| 6,188,694 | B1 | 2/2001 | Fine et al. | |
| 6,202,135 | B1 | 3/2001 | Kedem et al. | |
| 6,208,649 | B1 | 3/2001 | Kloth | |
| 6,209,059 | B1 | 3/2001 | Ofer et al. | |
| 6,219,699 | B1 | 4/2001 | McCloghrie et al. | |
| 6,226,771 | B1 | 5/2001 | Hilla et al. | |
| 6,260,120 | B1 * | 7/2001 | Blumenau et al. | 711/152 |
| 6,266,705 | B1 | 7/2001 | Ullum et al. | |
| 6,269,381 | B1 | 7/2001 | St. Pierre et al. | |
| 6,269,431 | B1 | 7/2001 | Dunham | |
| 6,295,575 | B1 | 9/2001 | Blumenau et al. | |
| 6,400,730 | B1 | 6/2002 | Latif et al. | |
| 6,542,961 | B1 | 4/2003 | Matsunami et al. | |
| 6,876,656 | B2 | 4/2005 | Brewer et al. | |
| 7,200,144 | B2 | 4/2007 | Terrell et al. | |
| 7,433,948 | B2 | 10/2008 | Edsall et al. | |
| 2001/0037406 | A1 | 11/2001 | Philbrick et al. | |
| 2002/0083120 | A1 | 6/2002 | Soltis | |
| 2002/0095547 | A1 | 7/2002 | Watanabe et al. | |
| 2002/0103889 | A1 | 8/2002 | Markson et al. | |
| 2002/0103943 | A1 | 8/2002 | Lo et al. | |
| 2002/0112113 | A1 | 8/2002 | Karpoff et al. | |
| 2002/0120741 | A1 | 8/2002 | Webb et al. | |
| 2002/0138675 | A1 * | 9/2002 | Mann | 710/61 |
| 2003/0026267 | A1 * | 2/2003 | Oberman et al. | 370/397 |
| 2003/0131182 | A1 * | 7/2003 | Kumar et al. | 711/5 |
| 2003/0140210 | A1 * | 7/2003 | Testardi | 711/203 |
| 2003/0172149 | A1 | 9/2003 | Edsall et al. | |
| 2004/0117438 | A1 * | 6/2004 | Considine et al. | 709/203 |
| 2004/0193969 | A1 | 9/2004 | Nemoto et al. | |
| 2008/0034167 | A1 | 2/2008 | Sharma et al. | |

FOREIGN PATENT DOCUMENTS

| | | |
|---|---|---|
| JP | 06-195177 | 7/1994 |
| JP | 07-311661 | 11/1995 |
| JP | 9198308 | 7/1997 |
| JP | 2000-029636 | 1/2000 |
| JP | 2000 242434 | 9/2000 |
| JP | 2000242434 | 9/2000 |
| JP | 2001-523856 | 11/2001 |
| WO | WO 01-80013 | 10/2001 |
| WO | WO 01/80013 | 10/2001 |

OTHER PUBLICATIONS

Japanese Office Action dated Dec. 9, 2008 from Application No. 2003-562776, 5 pgs.

Canadian Office Action dated Apr. 30, 2009 from Application No. 2,473,832.

Japanese Final Office Action dated Jun. 22, 2009 from Application No. 2003-562776.

Korean Office Action dated Dec. 29, 2009, Appl. No. 10-2004-7011405.

Canadian Office Action dated Feb. 22, 2011 from Canadian Serial No. 2,473,832.

Korean Office Action dated Dec. 29, 2009, Appl. No. 10-2004-7022405.

AU patent application No. 2003238219, Office Action mailed May 1, 2008.

AU patent application No. 2003238219, Notice of Grant mailed Jun. 24, 2009.

CA patent application No. 2,473,832, Notice of Allowance mailed Jul. 12, 2012.

CN patent application No. ZL03806717X, Office Action mailed Oct. 13, 2006.

CN patent application No. ZL03806717X, Notice of Grant mailed Mar. 18, 2007.

EP patent application No. 03731910.0, Office Action mailed May 20, 2008.

JP patent application No. 2003-562776, Office Action mailed Nov. 28, 2008.

KR patent application No. 10-2004-7011405, Office Action mailed Dec. 29, 2009.

KR patent application No. 10-2004-7011405, Notice of Decision to Grant mailed Aug. 31, 2010.

U.S. Appl. No. 10/056,238, Office Action mailed May 31, 2005.

U.S. Appl. No. 10/056,238, Office Action mailed Oct. 19, 2005.

U.S. Appl. No. 10/056,238, Office Action mailed Apr. 3, 2006.

U.S. Appl. No. 10/056,238, Office Action mailed Aug. 17, 2006.

U.S. Appl. No. 10/056,238, Office Action mailed Jan. 8, 2007.

U.S. Appl. No. 10/056,238, Office Action mailed Jun. 6, 2007.

U.S. Appl. No. 10/056,238, Office Action mailed Dec. 28, 2007.

U.S. Appl. No. 10/056,238, Notice of Allowance mailed May 23, 2008.

U.S. Appl. No. 11/499,372, Office Action mailed Jun. 5, 2009.

U.S. Appl. No. 11/499,372, Office Action mailed Dec. 31, 2009.

U.S. Appl. No. 11/499,372, Office Action mailed Nov. 19, 2010.

U.S. Appl. No. 11/499,372, Office Action mailed Feb. 1, 2012.

U.S. Appl. No. 11/499,372, Office Action mailed Aug. 30, 2012.

U.S. Appl. No. 11/499,372, Office Action mailed Mar. 28, 2013.

* cited by examiner

METHODS AND APPARATUS FOR IMPLEMENTING VIRTUALIZATION OF STORAGE WITHIN A STORAGE AREA NETWORK

RELATED APPLICATIONS

This application is a continuation application of U.S. patent application Ser. No. 10/056,238, entitled "Methods and Apparatus for Implementing Virtualization of Storage within a Storage Area Network, filed on Jan. 23, 2002, by Edsall et al, which is incorporated herein by reference for all purposes.

BACKGROUND OF THE INVENTION

1. Field of the Invention

The present invention relates to network technology. More particularly, the present invention relates to methods and apparatus for supporting virtualization of storage within a storage area network.

2. Description of the Related Art

In recent years, the capacity of storage devices has not increased as fast as the demand for storage. Therefore a given server or other host must access multiple, physically distinct storage nodes (typically disks). In order to solve these storage limitations, the storage area network (SAN) was developed. Generally, a storage area network is a high-speed special-purpose network that interconnects different data storage devices and associated data hosts on behalf of a larger network of users. However, although a SAN enables a storage device to be configured for use by various network devices and/or entities within a network, data storage needs are often dynamic rather than static.

FIG. 1A illustrates an exemplary conventional storage area network. More specifically, within a storage area network 102, it is possible to couple a set of hosts (e.g., servers or workstations) 104, 106, 108 to a pool of storage devices (e.g., disks). In SCSI parlance, the hosts may be viewed as "initiators" and the storage devices may be viewed as "targets." A storage pool may be implemented, for example, through a set of storage arrays or disk arrays 110, 112, 114. Each disk array 110, 112, 114 further corresponds to a set of disks. In this example, first disk array 110 corresponds to disks 116, 118, second disk array 112 corresponds to disk 120, and third disk array 114 corresponds to disks 122, 124. Rather than enabling all hosts 104-108 to access all disks 116-124, it is desirable to enable the dynamic and invisible allocation of storage (e.g., disks) to each of the hosts 104-108 via the disk arrays 110, 112, 114. In other words, physical memory (e.g., physical disks) may be allocated through the concept of virtual memory (e.g., virtual disks). This allows one to connect heterogeneous initiators to a distributed, heterogeneous set of targets (storage pool) in a manner enabling the dynamic and transparent allocation of storage.

The concept of virtual memory has traditionally been used to enable physical memory to be virtualized through the translation between physical addresses in physical memory and virtual addresses in virtual memory. Recently, the concept of "virtualization" has been implemented in storage area networks through various mechanisms. Virtualization interconverts physical storage and virtual storage on a storage network. The hosts (initiators) see virtual disks as targets. The virtual disks represent available physical storage in a defined but somewhat flexible manner. Virtualization provides hosts with a representation of available physical storage that is not constrained by certain physical arrangements/allocation of the storage.

One early technique, Redundant Array of Independent Disks (RAID), provides some limited features of virtualization. Various RAID subtypes have been implemented. In RAID1, a virtual disk may correspond to two physical disks 116, 118 which both store the same data (or otherwise support recovery of the same data), thereby enabling redundancy to be supported within a storage area network. In RAID0, a single virtual disk is striped across multiple physical disks. Some other types of virtualization include concatenation, sparing, etc. Some aspects of virtualization have recently been achieved through implementing the virtualization function in various locations within the storage area network. Three such locations have gained some level of acceptance: virtualization in the hosts (e.g., 104-108), virtualization in the disk arrays or storage arrays (e.g., 110-114), and virtualization in a storage appliance 126 separate from the hosts and storage pool. Unfortunately, each of these implementation schemes has undesirable performance limitations.

Virtualization in the storage array is one of the most common storage virtualization solutions in use today. Through this approach, virtual volumes are created over the storage space of a specific storage subsystem (e.g., disk array). Creating virtual volumes at the storage subsystem level provides host independence, since virtualization of the storage pool is invisible to the hosts. In addition, virtualization at the storage system level enables optimization of memory access and therefore high performance. However, such a virtualization scheme typically will allow a uniform management structure only for a homogenous storage environment and even then only with limited flexibility. Further, since virtualization is performed at the storage subsystem level, the physical-virtual limitations set at the storage subsystem level are imposed on all hosts in the storage area network. Moreover, each storage subsystem (or disk array) is managed independently. Virtualization at the storage level therefore rarely allows a virtual volume to span over multiple storage subsystems (e.g., disk arrays), thus limiting the scalability of the storage-based approach.

When virtualization is implemented on each host, it is possible to span multiple storage subsystems (e.g., disk arrays). A host-based approach has an additional advantage, in that a limitation on one host does not impact the operation of other hosts in a storage area network. However, virtualization at the host-level requires the existence of a software layer running on each host (e.g., server) that implements the virtualization function. Running this software therefore impacts the performance of the hosts running this software. Another key difficulty with this method is that it assumes a prior partitioning of the available storage to the various hosts. Since such partitioning is supported at the host-level and the virtualization function of each host is performed independently of the other hosts in the storage area network, it is difficult to coordinate storage access across the hosts. The host-based approach therefore fails to provide an adequate level of security. Due to this security limitation, it is difficult to implement a variety of redundancy schemes such as RAID which require the "locking" of memory during read and write operations. In addition, when mirroring is performed, the host must replicate the data multiple times, increasing its input-output and CPU load, and increasing the traffic over the SAN.

Virtualization in a storage area network appliance placed between the hosts and the storage solves some of the difficulties of the host-based and storage-based approaches. The storage appliance globally manages the mapping and allocation of physical storage to virtual volumes. Typically, the storage appliance manages a central table that provides the current mapping of physical to virtual. Thus, the storage appliance-based approach enables the virtual volumes to be implemented independently from both the hosts and the storage subsystems on the storage area network, thereby providing a higher level of security. Moreover, this approach supports virtualization across multiple storage subsystems. The key drawback of many implementations of this architecture is that every input/output (I/O) of every host must be sent through the storage area network appliance, causing significant performance degradation and a storage area network bottleneck. This is particularly disadvantageous in systems supporting a redundancy scheme such as RAID, since data must be mirrored across multiple disks. In another storage appliance-based approach, the appliance makes sure that all hosts receive the current version of the table. Thus, in order to enable the hosts to receive the table from the appliance, a software shim from the appliance to the hosts is required, adding to the complexity of the system. Moreover, since the software layer is implemented on the host, many of the disadvantages of the host-based approach are also present.

In view of the above, it would be desirable if various storage devices or portions thereof could be logically and dynamically assigned to various devices and/or entities within a network. Moreover, it would be beneficial if such a mechanism could be implemented to support the virtualization of storage within a SAN without the disadvantages of traditional virtualization approaches.

SUMMARY OF THE INVENTION

Methods and apparatus for implementing virtualization of storage in a storage area network are disclosed. This is accomplished through the use of one or more network devices capable of being placed in a data path between the hosts and the storage devices. As a result, neither the storage devices nor the hosts require additional software or hardware to support storage virtualization. Thus, the present invention is superior to the host based approach, which requires that each host be burdened by additional software to implement virtualization functionality. Moreover, the present invention enables multiple network devices to simultaneously manage the virtualization of heterogeneous storage devices. Importantly, switch-based virtualization may be implemented on a per port basis. Any number of ports on a switch can manage virtualization of its own traffic. This allows a network's virtualization capacity to scale with the number of ports. Since there are large numbers of ports in any network system, there will nearly always be sufficient bandwidth for virtualization. Accordingly, virtualization of storage may be achieved without many of the drawbacks present in conventional virtualization schemes.

In accordance with one aspect of the invention, methods and apparatus for implementing storage virtualization on a network device of a storage area network are disclosed. First, a frame or packet is received at a port of the network device. It is then determined that the frame or packet pertains to access of a virtual storage location of a virtual storage unit representing one or more physical storage locations on one or more physical storage units of the storage area network. A virtual-physical mapping between the one or more physical storage locations and the virtual storage location is then obtained. A new or modified frame or packet is then sent to an initiator or a target specified by the virtual-physical mapping.

In accordance with another aspect of the invention, the present invention is implemented on a per-port basis. In other words, selected virtualization ports of one or more network devices may implement virtualization functionality in hardware and/or software. This allows virtualization processing to scale with the number of ports. Accordingly, the present invention provides far greater bandwidth for virtualization than can be provided with host based or storage based virtualization schemes.

In accordance with yet another aspect of the invention, a virtualization port ensures that access to one or more physical storage locations represented by a virtual storage location are "locked" prior to accessing those storage locations. In this manner, the virtualization port ensures that no other network node will concurrently try to access the same data location. The lock may then be released when the access (e.g., read and/or write access) is completed. This is accomplished, in one embodiment, through synchronizing memory accesses submitted by virtualization ports. More particularly, a virtualization port submits a lock request to a master virtualization port (unless the virtualization port is itself a master). The master virtualization port manages all lock requests, and notifies a requesting slave virtualization port when a lock request has been granted. The master virtualization port similarly processes "lock release" requests.

Various network devices may be configured or adapted for intercepting, generating, modifying, and transmitting packets or frames to implement the disclosed virtualization functionality. These network devices include, but are not limited to, servers (e.g., hosts), routers, and switches. Moreover, the functionality for the above-mentioned virtualization processes may be implemented in software as well as hardware.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein. For example, packets and frames having the format described herein and provided on appropriate media are part of this invention.

These and other features of the present invention will be described in more detail below in the detailed description of the invention and in conjunction with the following figures.

DETAILED DESCRIPTION OF THE PREFERRED EMBODIMENTS

Figure 1A:
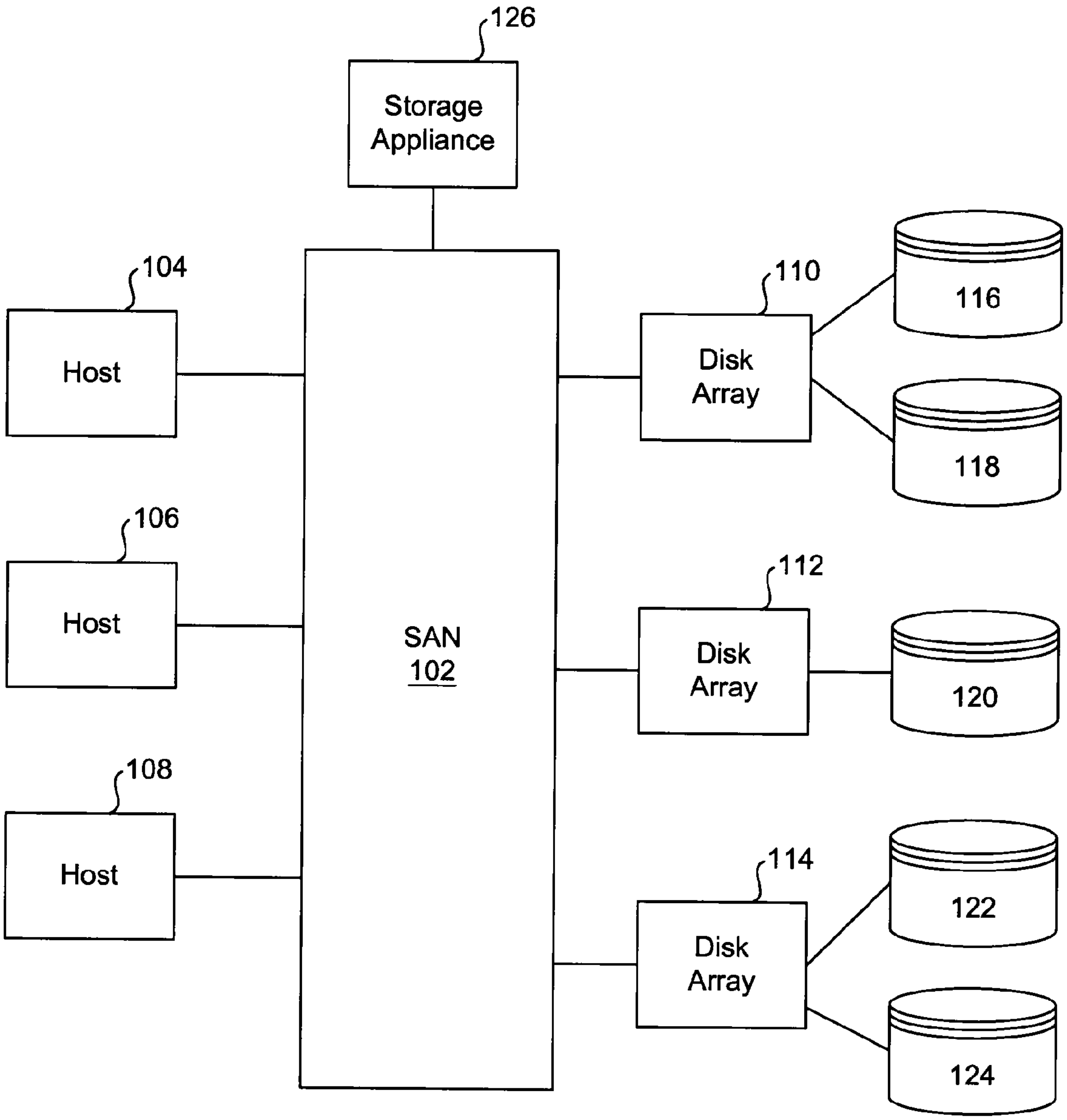
FIG. 1A is a block diagram illustrating an exemplary conventional storage area network.

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

In accordance with various embodiments of the present invention, virtualization of storage within a storage area network may be implemented within one or more network devices, which will be referred to herein as virtualization switches. More specifically, a network device such as a virtualization switch, which will be described in further detail below with reference to FIG. 3A, intercepts a frame or packet and obtains information from the frame or packet (e.g., virtual address). The network device then ascertains a virtual-physical mapping from the obtained information. For instance, the network device may use the obtained information as a "key" into a virtual to physical mapping table or algorithm to decide how to modify the frame or packet and/or whether to generate additional frames or packets.

A new or modified frame or packet may then be composed with information obtained from the virtual-physical mapping. The new or modified frame or packet is then sent to the intended recipient of the intercepted frame or packet. For instance, one or more frames or packets may be generated and transmitted to one or more physical addresses corresponding to the virtual address specified in the intercepted frame or packet. Thus, embodiments of the invention may be applied to a packet or frame, as will be described in further detail below. For convenience, the subsequent discussion will describe embodiments of the invention with respect to frames. Switches act on frames and use information about SANs to make switching decisions.

Note that the frames being received and transmitted by a virtualization switch possess the frame format specified for a standard protocol such as Ethernet or fibre channel. Hence, software and hardware conventionally used to generate such frames may be employed with this invention. Additional hardware and/or software is employed to modify and/or generate frames compatible with the standard protocol in accordance with this invention. Those of skill in the art will understand how to develop the necessary hardware and software to allow virtualization as described below.

The frame is generated by a network device such as a host, switch, or storage device. Obviously, the appropriate network devices should be configured with the appropriate software and/or hardware for performing virtualization functionality. Of course, all network devices within the storage area network need not be configured with the virtualization functionality. Rather, selected switches and/or ports may be configured with or adapted for virtualization functionality. Similarly, in various embodiments, such virtualization functionality may be enabled or disabled through the selection of various modes. Moreover, it may be desirable to configure selected ports of network devices as virtualization-capable ports capable of performing virtualization, either continuously, or only when in a virtualization enabled state.

The standard protocol employed in the storage area network (i.e., the protocol used to frame the data) will typically, although not necessarily, be synonymous with the "type of traffic" carried by the network. As explained below, the type of traffic is defined in some encapsulation formats. Examples of the type of traffic are typically layer 2 or corresponding layer formats such as Ethernet, Fibre Channel, and InfiniBand.

Figure 1B:
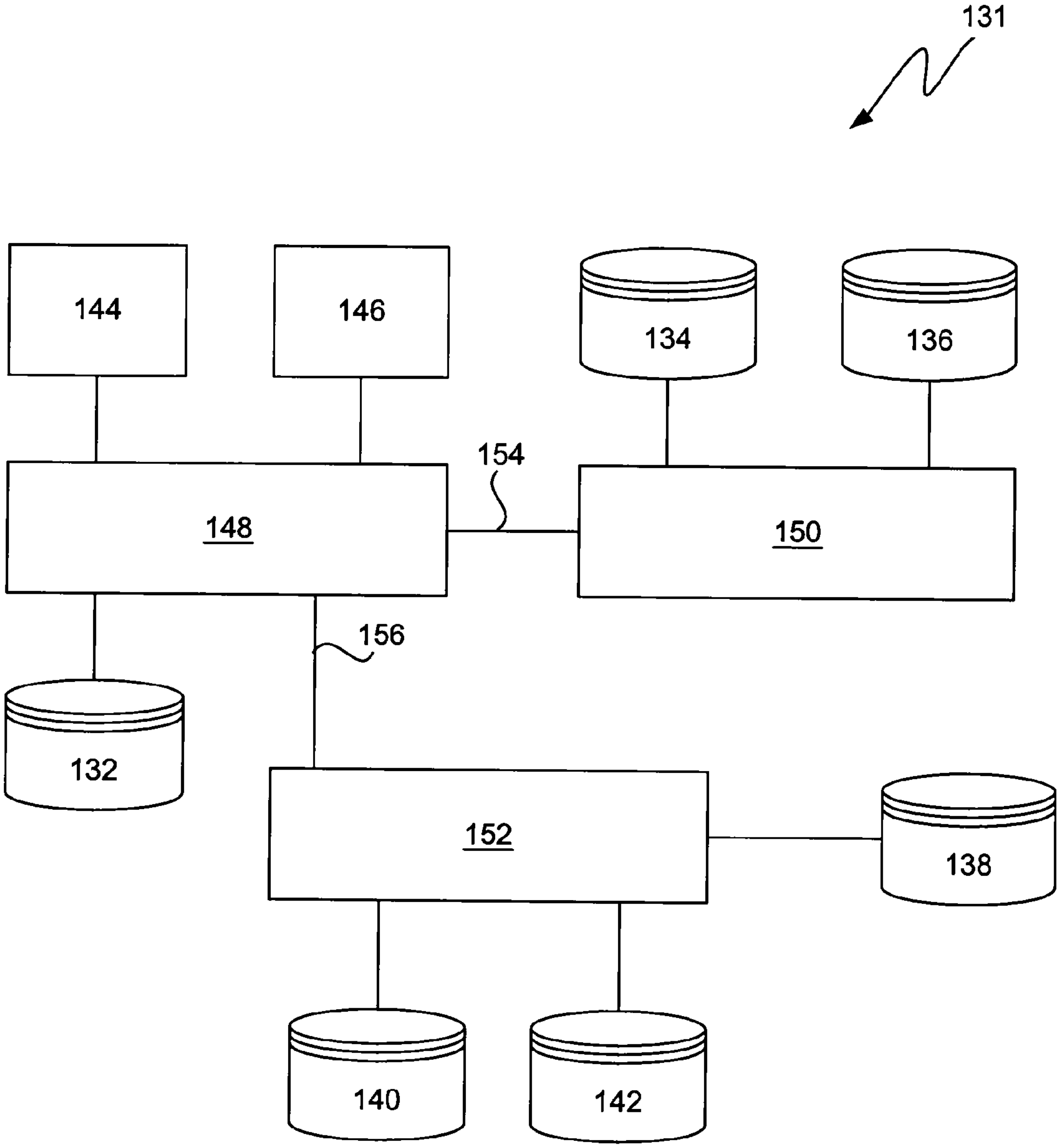
FIG. 1B is a block diagram illustrating a storage area network capable of implementing various embodiments of prior art virtualization functions.

As described above, a storage area network (SAN) is a high-speed special-purpose network that interconnects different data storage devices with associated network hosts (e.g., data servers or end user machines) on behalf of a larger network of users. A SAN is defined by the physical configuration of the system. In other words, those devices in a SAN must be physically interconnected. Within a storage area network 131 such as that illustrated in FIG. 1B, various storage devices 132, 134, 136, 138, 140, and 142 may be implemented, which may be homogeneous (e.g., identical device types, sizes, or configurations) as well as heterogeneous (e.g., different device types, sizes or configurations). Data may be read from, as well as written to, various portions of the storage devices 132-142 in response to commands sent by hosts 144 and 146. Communication among the storage devices and hosts is accomplished by coupling the storage devices and hosts together via one or more switches, routers, or other network nodes configured to perform a switching function. In this example, switches 148, 150, and 152 communicate with one another via interswitch links 154 and 156.

As indicated above, this invention pertains to "virtualization" in storage networks. Unlike prior methods, virtualization in this invention is implemented on the switches or other "interior" network nodes of a storage area network. Preferably, multiple switches making up a network fabric will together implement the virtualization model of a given storage area network. Further, the virtualization of this invention typically is implemented on a per port basis. In other words, a multi-port switch will have virtualization separately implemented on one or more of its ports. Individual ports have dedicated logic for handing the virtualization functions for packets or frames handled by the individual ports. This allows virtualization processing to scale with the number of ports, and provides far greater bandwidth for virtualization than can be provided with host based or storage based virtualization schemes. In such prior art approaches the number of connections between hosts and the network fabric or between storage nodes and the network fabric are limited—at least in comparison to the number of ports in the network fabric.

In a specific and preferred embodiment of the invention, the virtualization logic is separately implemented at individual ports of a given switch—rather than having centralized processing for all ports of a switch. This allows the virtualization processing capacity to be closely matched with the exact needs of the switch on a per port basis. If a central processor is employed for the entire switch (serving numerous ports), the processor must be designed/selected to handle maximum traffic at all ports. For many applications, this represents extremely high processing requirements and a very large/expensive processor. If the central processor is too small, the switch will at times be unable to keep up with the switching/virtualization demands of the network.

Virtualization may take many forms. In general, it may be defined as logic or procedures that inter-relate physical storage and virtual storage on a storage network. Hosts see a representation of available physical storage that is not constrained by the physical arrangements or allocations inherent in that storage. One example of a physical constraint that is transcended by virtualization includes the size and location of constituent physical storage blocks. For example, logical units as defined by the Small Computer System Interface (SCSI) standards come in precise physical sizes (e.g., 36 GB and 72 GB). Virtualization can represent storage in virtual logical units that are smaller or larger than the defined size of a physical logical unit. Further, virtualization can present a virtual logical unit comprised of regions from two or more different physical logical units, sometimes provided on devices from different vendors. Preferably, the virtualization operations are transparent to at least some network entities (e.g., hosts). In some general ways, virtualization on a storage area network is similar to virtual memory on a typical computer system. Virtualization on a network, however, brings far greater complexity and far greater flexibility. The complexity arises directly from the fact that there are a number of separately interconnected network nodes. Virtualization must span these nodes. The nodes include hosts, storage subsystems, and switches (or comparable network traffic control devices such as routers). Often the hosts and/or storage subsystems are heterogeneous, being provided by different vendors. The vendors may employ distinctly different protocols (standard protocols or proprietary protocols). Thus, in many cases, virtualization provides the ability to connect heterogeneous initiators (e.g., hosts or servers) to a distributed, heterogeneous set of targets (storage subsystems), enabling the dynamic and transparent allocation of storage.

Examples of network specific virtualization operations include the following: RAID 0 through RAID 5, concatenation of memory from two or more distinct logical units of physical memory, sparing (auto-replacement of failed physical media), remote mirroring of physical memory, logging information (e.g., errors and/or statistics), load balancing among multiple physical memory systems, striping (e.g., RAID 0), security measures such as access control algorithms for accessing physical memory, resizing of virtual memory blocks, Logical Unit (LUN) mapping to allow arbitrary LUNs to serve as boot devices, backup of physical memory (point in time copying), and the like. These are merely examples of virtualization functions. This invention is not limited to this full set or any particular subset thereof.

In much of the discussion herein, the functions of virtualization switches of this invention are described in terms of the SCSI protocol. This is because many storage area networks in commerce run a SCSI protocol to access storage sites. Frequently, the storage area network employs fibre channel (FC-PH (ANSI X3.230-1994, Fibre Channel—Physical and Signaling Interface) as a lower level protocol and runs IP and SCSI on top of fibre channel. Note that the invention is not limited to any of these protocols. For example, fibre channel may be replaced with Ethernet, Infiniband, and the like. Further the higher level protocols need not include SCSI. For example, other protocols may be used by hosts to access storage. In addition, it is important to note that SCSI will be used herein to refer to any implementation of SCSI over FC, iSCSI (SCSI over IP), parallel SCSI (SCSI over a parallel cable), serial SCSI (SCSI over serial cable), and to all the other incarnations of SCSI.

Because SCSI is so widely used in storage area networks, much of the terminology used herein will be SCSI terminology. The use of SCSI terminology (e.g., “initiator” and “target”) does not imply that the describe procedure or apparatus must employ SCSI. Before going further, it is worth explaining a few of the SCSI terms that will be used in this discussion. First an “initiator” is a device (usually a host system) that requests an operation to be performed by another device. Typically, in the context of this document, a host initiator will request a read or write operation be performed on a region of virtual or physical memory. Next, a “target” is a device that performs an operation requested by an initiator. For example, a target physical memory disk will obtain or write data as initially requested by a host initiator. Note that while the host initiator may provide instructions to read from or write to a “virtual” target having a virtual address, a switch of this invention must first convert those instructions to a physical target address before instructing the target.

Targets may be divided into physical or virtual “logical units.” These are specific devices addressable through the target. For example, a physical storage subsystem may be organized in a number of distinct logical units. In this document, hosts view virtual memory as distinct virtual logical units. Sometimes herein, logical units will be referred to as “LUNs.” In the SCSI standard, LUN refers to a logical unit number. But in common parlance, LUN also refers to the logical unit itself.

Central to virtualization is the concept of a “virtualization model.” This is the way in which physical storage provided on storage subsystems (such as disk arrays) is related to a virtual storage seen by hosts or other initiators on a network. While the relationship may take many forms and be characterized by various terms, a SCSI-based terminology will be used, as indicated above. Thus, the physical side of the storage area network will be described as a physical LUN. The host side, in turn, sees one or more virtual LUNs, which are virtual representations of the physical LUNs. The mapping of physical LUNs to virtual LUNs may logically take place over one, two, or more levels. In the end, there is a mapping function that can be used by switches of this invention to interconvert between physical LUN addresses and virtual LUN addresses.

Figure 2:
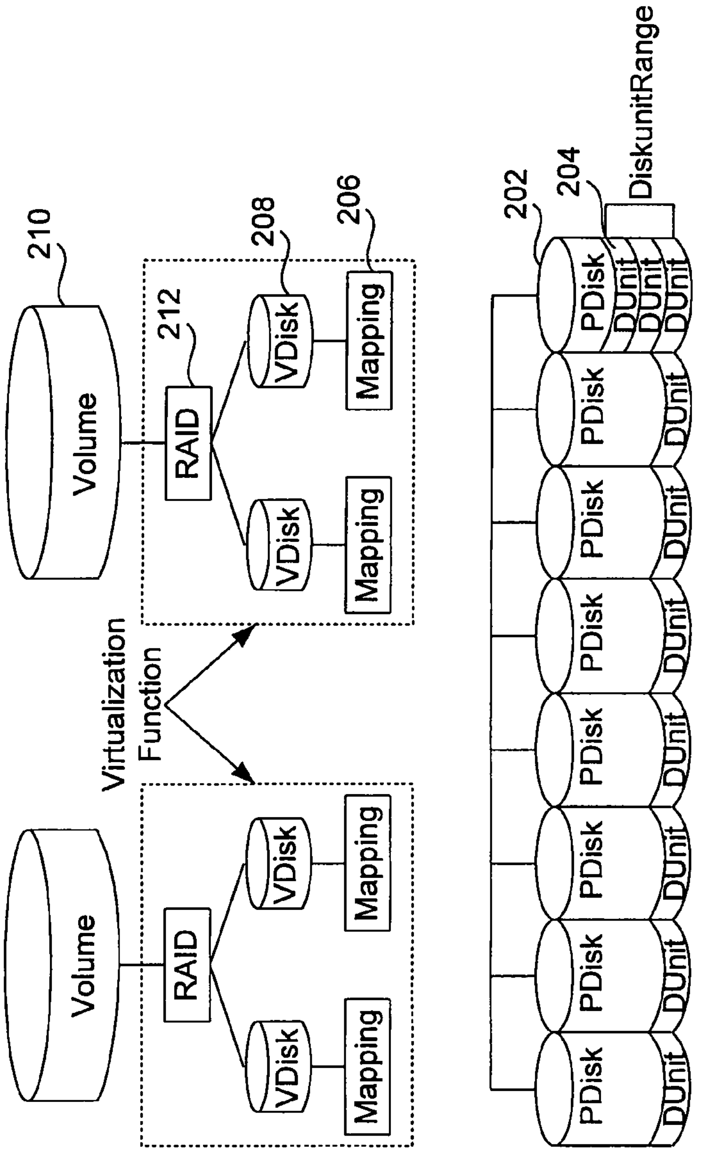
FIG. 2 is a block diagram illustrating a virtualization model that may be implemented in accordance with various embodiments of the invention.

FIG. 2 is a block diagram illustrating an example of a virtualization model that may be implemented within a storage area network in accordance with various embodiments of the invention. As shown, the physical storage of the storage area network is made up of one or more physical LUNs, shown here as physical disks 202. Each physical LUN is a device that is capable of containing data stored in one or more contiguous blocks which are individually and directly accessible. For instance, each block of memory within a physical LUN may be represented as a block 204, which may be referred to as a Disk Unit (Dunit).

Through a mapping function 206, it is possible to convert physical LUN addresses associated with physical LUNs 202 to virtual LUN addresses, and vice versa. More specifically, as described above, the virtualization and therefore the mapping function may take place over one or more levels. For instance, as shown, at a first virtualization level, one or more virtual LUNs 208 each represents one or more physical LUNs 202, or portions thereof. The physical LUNs 202 that together make up a single virtual LUN 208 need not be contiguous. Similarly, the physical LUNs 202 that are mapped to a virtual LUN 208 need not be located within a single target. Thus, through virtualization, virtual LUNs 208 may be created that represent physical memory located in physically distinct targets, which may be from different vendors, and therefore may support different protocols and types of traffic.

Although the virtualization model may be implemented with a single level, a hierarchical arrangement of any number of levels may be supported by various embodiments of the present invention. For instance, as shown, a second virtualization level within the virtualization model of FIG. 2 is referred to as a high-level VLUN or volume 210. Typically, the initiator device "sees" only VLUN 210 when accessing data.

In this example, VLUN 210 is implemented as a "logical" RAID array of virtual LUNs 208. Moreover, such a virtualization level may be further implemented, such as through the use of striping and/or mirroring. For instance, RAID 1+0 or RAID 0+1 operations may be performed consecutively, as will be described in further detail below with reference to FIGS. 10A through 10C. In addition, it is important to note that it is unnecessary to specify the number of virtualization levels to support the mapping function 206. Rather, an arbitrary number of levels of virtualization may be supported, for example, through a hierarchical mapping function. For instance, various levels of nodes may be built and maintained in a tree data structure, linked list, or other suitable data structure that can be traversed.

Each initiator may therefore access physical LUNs via nodes located at any of the levels of the hierarchical virtualization model. Nodes within a given virtualization level of the hierarchical model implemented within a given storage area network may be both visible to and accessible to an allowed set of initiators (not shown). Nodes within a particular virtualization level (e.g., VLUNs) need to be created before functions (e.g., read, write) may be operated upon them. This may be accomplished, for example, through a master boot record of a particular initiator. In addition, various initiators may be assigned read and/or write privileges with respect to particular nodes (e.g., VLUNs) within a particular virtualization level. In this manner, a node within a particular virtualization level may be both visible to and accessible by selected initiators.

Figure 3A:
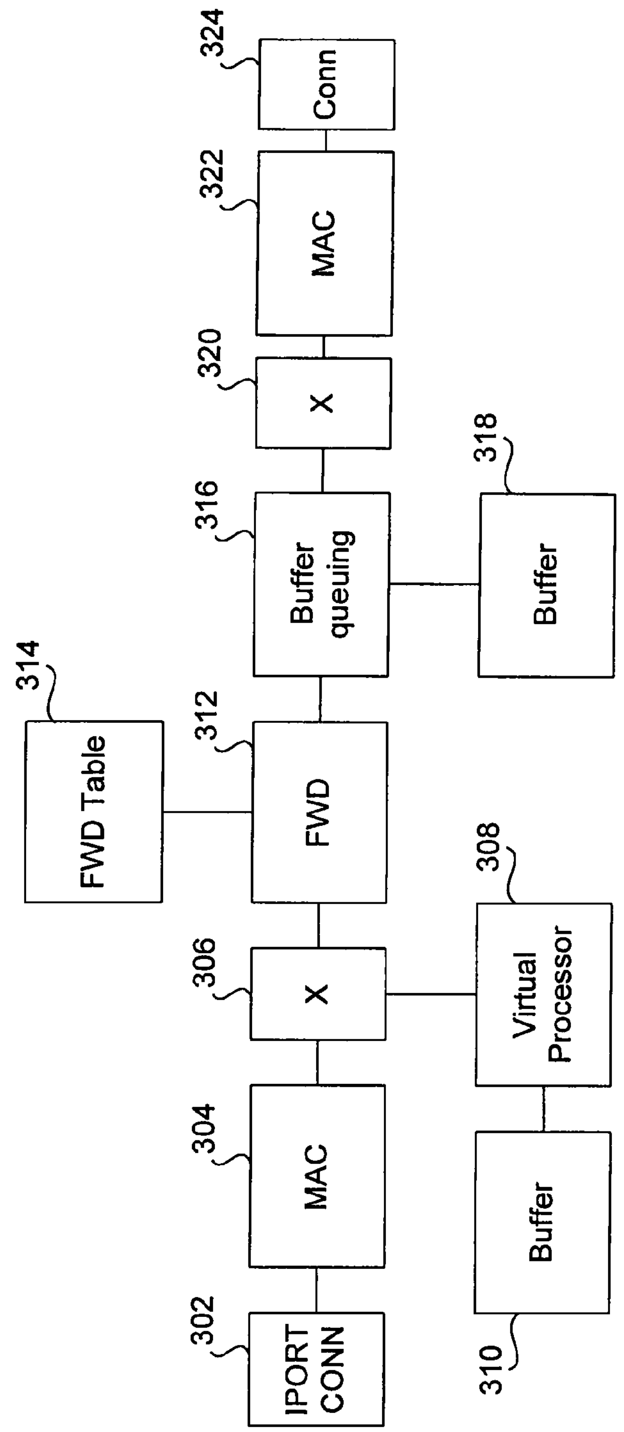
FIG. 3A is a block diagram illustrating an exemplary virtualization switch in which various embodiments of the present invention may be implemented.

As described above, various switches within a storage area network may be virtualization switches supporting virtualization functionality. FIG. 3A is a block diagram illustrating an exemplary virtualization switch in which various embodiments of the present invention may be implemented. As shown, data is received by an intelligent, virtualization port via a bi-directional connector 302. In association with the incoming port, Media Access Control (MAC) block 304 is provided, which enables frames of various protocols such as Ethernet or fibre channel to be received. In addition, a virtualization intercept switch 306 determines whether an address specified in an incoming frame pertains to access of a virtual storage location of a virtual storage unit representing one or more physical storage locations on one or more physical storage units of the storage area network. In this example, the frame is received via a bi-directional connector 302 and the new or modified frame exits from the switch fabric 320. However, it is important to note that a virtualization switch may be implemented in an alternate manner. For instance, the frame may be received from the fabric 320, redirected by 306 to 308, virtualized and sent back to the switch fabric 320. This is important when a host and disk are connected to a standard line card such as that illustrated in FIG. 3B, and the host and disk share several virtualization cards such as that illustrated in FIG. 3A.

When the virtualization intercept switch 306 determines that the address specified in an incoming frame pertains to access of a virtual storage location rather than a physical storage location, the frame is processed by a virtualization processor 308 capable of performing a mapping function such as that described above. More particularly, the virtualization processor 308 obtains a virtual-physical mapping between the one or more physical storage locations and the virtual storage location. In this manner, the virtualization processor 308 may look up either a physical or virtual address, as appropriate. For instance, it may be necessary to perform a mapping from a physical address to a virtual address or, alternatively, from a virtual address to one or more physical addresses.

Once the virtual-physical mapping is obtained, the virtualization processor 308 may then employ the obtained mapping to either generate a new frame or modify the existing frame, thereby enabling the frame to be sent to an initiator or a target specified by the virtual-physical mapping. For instance, a frame may be replicated multiple times in the case of a mirrored write. This replication requirement may be specified by a virtual-physical mapping function. In addition, the source address and/or destination addresses are modified as appropriate. For instance, for data from the target, the virtualization processor replaces the source address, which was originally the physical LUN address with the corresponding virtual LUN and virtual address.

In the destination address, the port replaces its own address with that of the initiator. For data from the initiator, the port changes the source address from the initiator's address to the port's own address. It also changes the destination address from the virtual LUN/address to the corresponding physical LUN/address. The new or modified frame may then be provided to the virtualization intercept switch 306 to enable the frame to be sent to its intended destination.

While the virtualization processor 308 obtains and applies the virtual-physical mapping, the frame or associated data may be stored in a temporary memory location (e.g., buffer) 310. In addition, it may be necessary or desirable to store data that is being transmitted or received until it has been confirmed that the desired read or write operation has been successfully completed. As one example, it may be desirable to write a large amount of data to a virtual LUN, which must be transmitted separately in multiple frames. It may therefore be desirable to temporarily buffer the data until confirmation of receipt of the data is received. As another example, it may be desirable to read a large amount of data from a virtual LUN, which may be received separately in multiple frames. Furthermore, this data may be received in an order that is inconsistent with the order in which the data should be transmitted to the initiator of the read command. In this instance, it may be beneficial to buffer the data prior to transmitting the data to the initiator to enable the data to be re-ordered prior to transmission. Similarly, it may be desirable to buffer the data in the event that it is becomes necessary to verify the integrity of the data that has been sent to an initiator (or target).

The new or modified frame is then received by a forwarding engine 312, which obtains information from various fields of the frame, such as source address and destination address. The forwarding engine 312 then accesses a forwarding table 314 to determine whether the source address has access to the specified destination address. More specifically, the forwarding table 314 may include physical LUN addresses as well as virtual LUN addresses. The forwarding engine 312 also determines the appropriate port of the switch via which to send the frame, and generates an appropriate routing tag for the frame.

Once the frame is appropriately formatted for transmission, the frame will be received by a buffer queuing block 316 prior to transmission. Rather than transmitting frames as they are received, it may be desirable to temporarily store the frame in a buffer or queue 318. For instance, it may be desirable to temporarily store a packet based upon Quality of Service in one of a set of queues that each correspond to different priority levels. The frame is then transmitted via switch fabric 320 to the appropriate port. As shown, the outgoing port has its own MAC block 322 and bi-directional connector 324 via which the frame may be transmitted.

Figure 3B:
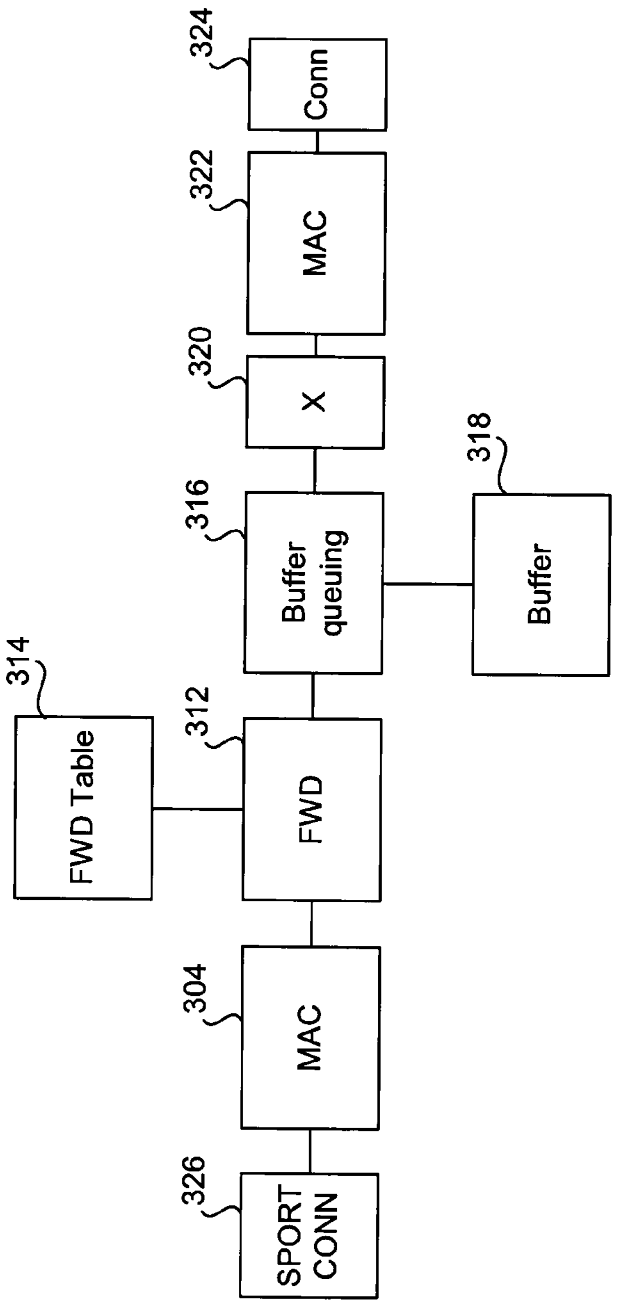
FIG. 3B is a block diagram illustrating an exemplary standard switch in which various embodiments of the present invention may be implemented.

As described above, all switches in a storage area network need not be virtualization switches. In other words, a switch may be a standard switch in which none of the ports implement "intelligent," virtualization functionality. FIG. 3B is a block diagram illustrating an exemplary standard switch in which various embodiments of the present invention may be implemented. As shown, a standard port 326 has a MAC block 304. However, a virtualization intercept switch and virtualization processor such as those illustrated in FIG. 3A are not implemented. A frame that is received at the incoming port is merely processed by the forwarding engine 312 and its associated forwarding table 314. Prior to transmission, a frame may be queued 316 in a buffer or queue 318. Frames are then forwarded via switch fabric 320 to an outgoing port. As shown, the outgoing port also has an associated MAC block 322 and bi-directional connector 324.

As described above, the present invention may be implemented, at least in part, by a virtualization switch. Virtualization is preferably performed on a per-port basis rather than per switch. Thus, each virtualization switch may have one or more virtualization ports that are capable of performing virtualization functions, as well as ports that are not capable of such virtualization functions. In one embodiment, the switch is a hybrid, with a combination of line cards as described above with reference to FIG. 3A and FIG. 3B.

Although the network devices described above with reference to FIGS. 3A and 3B are described as switches, these network devices are merely illustrative. Thus, other network devices such as routers may be implemented to receive, process, modify and/or generate packets or frames with functionality such as that described above for transmission in a storage area network. Moreover, the above-described network devices are merely illustrative, and therefore other types of network devices may be implemented to perform the disclosed virtualization functionality.

Figure 4:
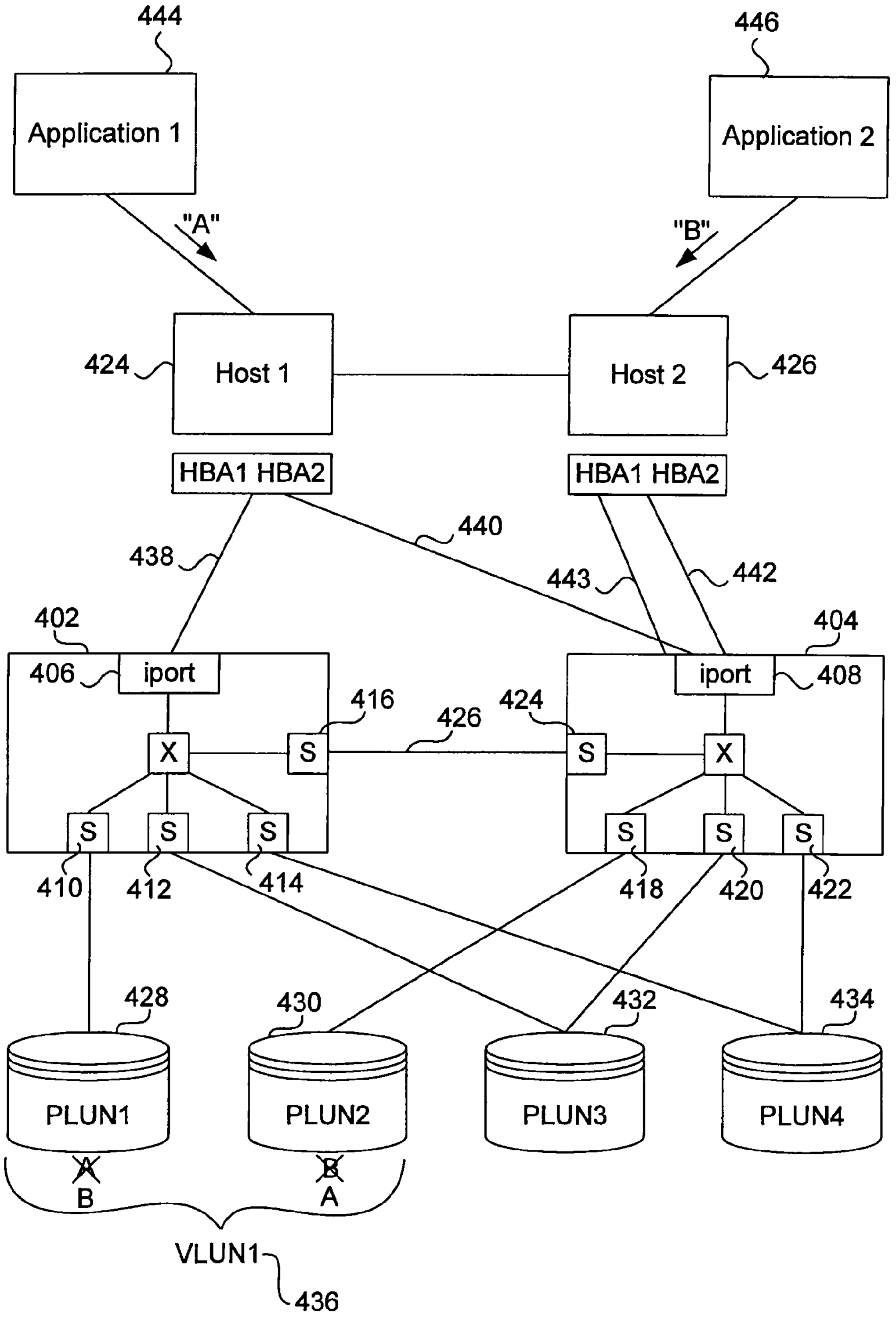
FIG. 4 is a block diagram illustrating an exemplary system architecture in which various embodiments of the invention may be implemented.

As described above, a storage area network may be implemented with virtualization switches adapted for implementing virtualization functionality as well as standard switches. FIG. 4 is a block diagram illustrating an exemplary system architecture in which various embodiments of the invention may be implemented. In this example, two virtualization switches 402 and 404 are implemented to support transmission of frames within the storage area network. Each virtualization switch may include one or more "intelligent" virtualization ports as well as one or more standard ports. More specifically, the virtualization switches 402 and 404 in this example each have a virtualization port 406 and 408, respectively. In addition, each of the virtualization switches 402 and 404 has multiple standard ports 410, 412, 414, 416 and 418, 420, 422, 424, respectively. In order to support the virtual-physical mapping and accessibility of memory by multiple applications and/or hosts, it is desirable to coordinate memory accesses between the virtualization switches 402 and 404. Communication between the switches 402 and 404 may be accomplished by an inter-switch link 426 between two switches. As shown, the inter-switch link 426 may be between two standard ports. In other words, synchronization of memory accesses by two switches merely requires communication between the switches. This communication may be performed via intelligent virtualization ports, but need not be performed via a virtualization port or between two virtualization ports.

Virtualization of storage is performed for a variety of reasons, such as mirroring. For example, consider four physical LUNs, PLUN1 428, PLUN2 430, PLUN3 432, and PLUN4 434. It is often desirable to group two physical LUNs for the purpose of redundancy. Thus, as shown, two physical LUNs, PLUN1 428 and PLUN2 430 are represented by a single virtual LUN, VLUN1 436. When data is mirrored, the data is mirrored (e.g., stored) in multiple physical LUNs to enable the data to be retrieved upon failure of one of the physical LUNs.

Various problems may occur when data is written to or read from one of a set of "mirrors." For instance, multiple applications running on the same or different hosts, may simultaneously access the same data or memory location (e.g., disk location or disk block), shown as links 438, 440. Similarly, commands such as read or write commands sent from two different hosts, shown at 438, 440 and 442, 443 may be sent in the same time frame. Each host may have corresponding Host Bus Adapters (HBA) as shown. Ideally, the data that is accessed or stored by the applications or hosts should leave the mirrors intact. More particularly, even after a write operation to one of the mirrors, the data stored in all of the mirrors will remain consistent. In other words, the mirrors should continue to serve as redundant physical LUNs for the other mirrors in the event that one of the mirrors should fail.

In conventional systems in which mirroring is enabled, a relatively simultaneous access by two different sources often results in an inherent race condition. For instance, consider the situation when two different clients send a write command to the same virtual LUN. As shown, application 1 444 running on Host 1 424 sends a write command with the data "A," while application 2 446 running on Host 2 426 sends a write command with the data "B." If the first application 444 sends data "A" to VLUN1 436 first, the data "A" may be written, for example, to PLUN1 428. However, before it can be mirrored to PLUN2 430, the second application 446 may send data "B." Data "B" may be written to PLUN2 430 prior to being mirrored to PLUN1 428. Data "A" is then mirrored to PLUN2 430. Similarly, data "B" is mirrored to PLUN1 428. Thus, as shown, the last write operation controls the data to be stored in a particular physical LUN. In this example, upon completion of both mirror operations, PLUN1 428 stores data "B" while PLUN2 430 stores data "A." Thus, the two physical LUNs no longer mirror one another, resulting in ambiguous data.

In order to solve the inherent race condition present in conventional systems, the virtualization ports communicate with one another, as described above, via an inter-switch link such as 426. In other words, the ports synchronize their access of virtual LUNs with one another. This is accomplished, in one embodiment, through the establishment of a single master virtualization port that is known to the other virtualization ports as the master port. The identity of the master port may be established through a variety of mechanisms. As one example, the master port may send out a multicast message to the other virtualization ports indicating that it is the master virtualization port. As another example, the virtualization ports may be initialized with the identity of the master port. In addition, in the event of failure of the master virtualization port, it may be desirable to enable one of the slave virtualization ports to substitute as a master port.

The master virtualization port may solve the problem caused due to the inherent race condition in a variety of ways. One solution is the lock mechanism described herein. An alternative approach is to redirect the SCSI command to the master virtualization port, which will be in charge of performing the virtual to physical mapping as well as the appropriate interlocking. The slave port may then learn the mapping from the master port as well as handle the data.

Prior to accessing a virtual LUN, a slave virtualization port initiates a conversation with the master virtualization port to request permission to access the virtual LUN. This is accomplished through a locking mechanism that locks access to the virtual LUN until the lock is released. For instance, the slave virtualization port (e.g., port 406) may request the grant of a lock from the master virtualization port (e.g., port 408). The master virtualization port then informs the slave virtualization port when the lock is granted. When the lock is granted, access to the corresponding physical storage locations is "locked" until the lock is released. In other words, the holder of the lock has exclusive read and/or write access to the data stored in those physical locations. In this example, data "A" is then stored in both physical LUN1 428 and physical LUN2 430. When the slave virtualization port 406 receives a STATUS OK message indicating that the write operation to the virtual LUN was successful, the lock may be released. The master virtualization port 408 may then obtain a lock to access of the virtual LUN until data "B" is stored in both mirrors of the VLUN1 436. In this manner, virtualization ports synchronize access to virtual LUNs to ensure integrity of the data stored in the underlying physical storage mediums.

Normally, in SCSI protocols for memory access, the commands are sent by initiators and targets to effect a read or write operation. To request read or write access to a target, the initiator sends a request command (CMD). More specifically, the command requests access to a particular memory location in the target. To this end, the request command contains the following information: SCSI LUN, the starting memory address for data to be accessed within the logical unit (an offset from the beginning address of the logical unit), the length of the memory access (e.g., in blocks or bytes), and type of command (read or write). Upon receiving the request command, the target device (typically via a memory controller) determines whether the requested memory location can be accessed. If so and the access is a write operation, the target replies to the initiator with a transfer ready signal (XFR_RDY), which also indicates the amount of data that can be transferred. Thereafter the initiator sends one or more frames of data to the target. The controller of the target attempts to write the incoming data to the specified memory location(s). Upon command completion (successful or unsuccessful), the target returns a status byte to the initiator. Since most error and exception conditions cannot be adequately described with a single status byte, one status code, CHECK CONDITION, indicates that additional information is available. Assuming that the write operation is a success, then the target replies with a STATUS OK signal. To end the operation, the target sends a COMMAND COMPLETE message to the initiator. The SCSI write operation is then complete.

If the request command specifies a read operation, then the target directly replies with data that has been read from the requested location. A transfer ready signal is not required. When all requested data has been sent, the target replies with a STATUS OK and COMMAND COMPLETE signals. For comparison with the present invention, FIGS. 5 and 6 described below set forth the standard SCSI read and write operations.

In accordance with this invention, virtualization switches are interposed between targets and initiators (usually storage subsystems and hosts). Virtualization ports on these switches intercept SCSI commands and take certain actions before notifying the initiator or target, as the case may be. FIGS. 7 through 10, described below, show various scenarios by which the virtualization switches handle SCSI commands.

Generally, in the case of request commands (read or write), the virtualization port takes three actions. First, it converts the virtual LUN and associated address and length of the request to its corresponding physical LUN and associated address and length. Of course, in the case of mirroring and striping, the result of this conversion from a virtual LUN, address and length may produce multiple corresponding sets of physical LUN, address, and length. This may be accomplished by consulting an internal table or list of mappings between virtual and physical locations. Of course, other suitable data structures such as lists and trees may also be used. In addition, it is also possible to compute a virtual-physical mapping using an algorithm (for example, in the case of striping). Note that a single virtual block of data may correspond to two or more physical blocks of data—spanning multiple LUNs. In such case, the virtualization port must recognize that the physical mapping specifies two separate physical locations.

Second, after the physical LUNs, addresses, and lengths have been identified by the virtualization port, the port must then ensure that no other node will concurrently try to access the same data location. So, in accordance with one embodiment, the virtualization requests that the physical data location be locked until the access is completed. This may be accomplished by submitting a lock request to a master virtualization port—unless the requesting port is itself a master. It is important to note that the lock may be handled either in the virtual address space or in the physical address space. In other words, it is possible to lock a range of bytes in a VLUN or on a PLUN. In addition, it is possible to perform the lock either before the virtual to physical translation or after translation is performed. The result should be the same in either case.

Third, after the lock is granted, the virtualization port prepares one or more new (replacement) SCSI request commands. These commands include the physical location (or locations) corresponding to the virtual locations specified in the intercepted request command from the initiator. The commands also include the virtualization port address as the source address. That way, the reply from the target comes back to the virtualization port, rather than the host. For example, if a virtualization port receives a transfer ready (XFR_RDY) command from the target, it may send a corresponding transfer ready command back to the initiator. However, a LUN field (that contains either the VLUN or the PLUN) is typically not present in a transfer ready command or in data that is transferred. Such a LUN field is present only in a SCSI command. Rather, in one embodiment, the intelligent port is able to correlate the transfer ready and the data with the SCSI command using other fields in the Fibre Channel frame.

In some cases, the virtualization port will receive multiple transfer ready commands for a single read/write request. This is typically the case when the virtual memory location maps to multiple distinct physical LUNs. In that case, each physical LUN will reply with a transfer ready command in response to the read/write request commands sent by the virtualization port. Thus, the virtualization port should be able to send the initiator only a single transfer ready command when the initiator sends only a single request command—regardless of how many physical LUNs are implicated in the request. Virtualization ports treat status commands just as they treat transfer ready commands.

With respect to actual data transfers between the initiators and targets, the virtualization switch simply intercepts the data frames and replaces the source and destination addresses as appropriate. For data from the target, the port replaces the source address, which was originally the physical LUN address with the corresponding virtual LUN and virtual address.

In the destination address, the port replaces its own address with that of the initiator. For data from the initiator, the port changes the source address from the initiator's address to the port's own address. It also changes the destination address from the virtual LUN/address to the corresponding physical LUN/address. There are also cases in which this processing is more complex. For example, in one embodiment, in the case of mirroring or striping, the status is not simply be rewritten and sent do the initiator. Rather, all the status' for all the commands sent toward the PLUNs are collected. If all the status' are SUCCESS, a status of SUCCESS is returned to the initiator.

Figure 5:
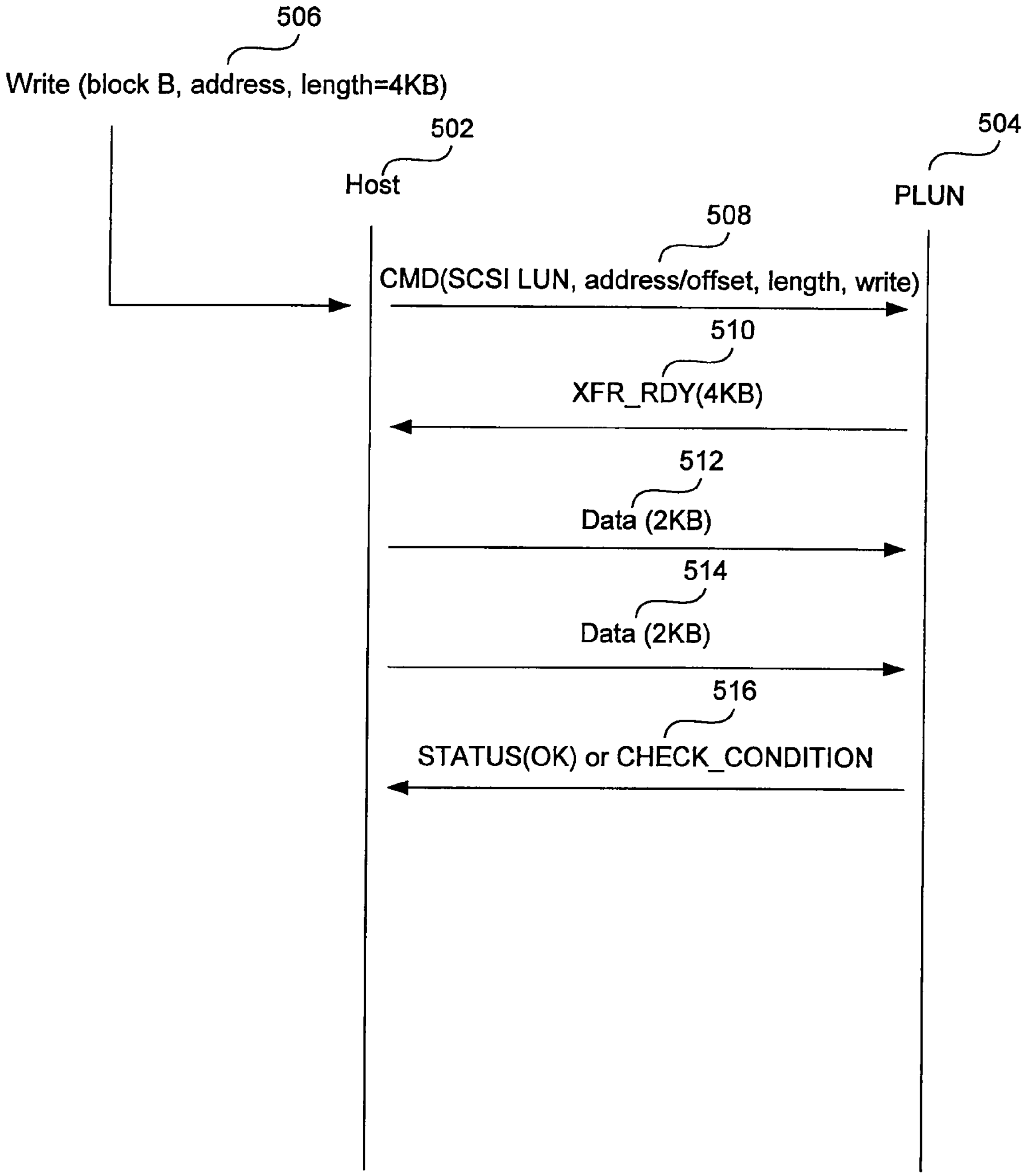
FIG. 5 is an exemplary transaction flow diagram illustrating a conventional SCSI write operation.

Before illustrating the manner in which SCSI commands are intercepted, modified, generated, and transmitted to support storage virtualization, it is useful to discuss the conventional SCSI read and write operations. FIG. 5 is an exemplary transaction flow diagram illustrating a conventional SCSI write operation. As shown, the transactions are performed between a host and a physical LUN, represented by vertical lines 502 and 504, respectively. When an application running on a host wishes to store data into a disk, it issues a write command 506 through an Operating System library. The write command is passed to a SCSI driver that forward it toward the appropriate disk. As shown, the write command will typically identify data to be stored, a specific physical address in memory, and an amount of memory required at that physical address. In this example, the amount of memory required is 4 KB.

When the write command is received by the driver 502, this triggers a SCSI exchange. More specifically, the driver 502 sends a SCSI write command 508 specifying a physical LUN (PLUN), a physical address (i.e., offset), a length of memory required (e.g., 4 KB), and which indicates that the command is a write command. When the PLUN is ready to receive the data, the PLUN 504 then sends a transfer ready command 510 indicating that the PLUN 504 is ready to receive 4 KB of data. There is typically a maximum size of a frame that often prohibits an entire data set to be transmitted in a single frame. Thus, in this example, the host 502 sends data in two sequential frames 512, 514, which each transmit 2 KB of the original 4 KB of data. The PLUN 504 then responds with a STATUS (OK) message 516 when the write is successful or a CHECK_CONDITION message in the event of an error.

Figure 6:
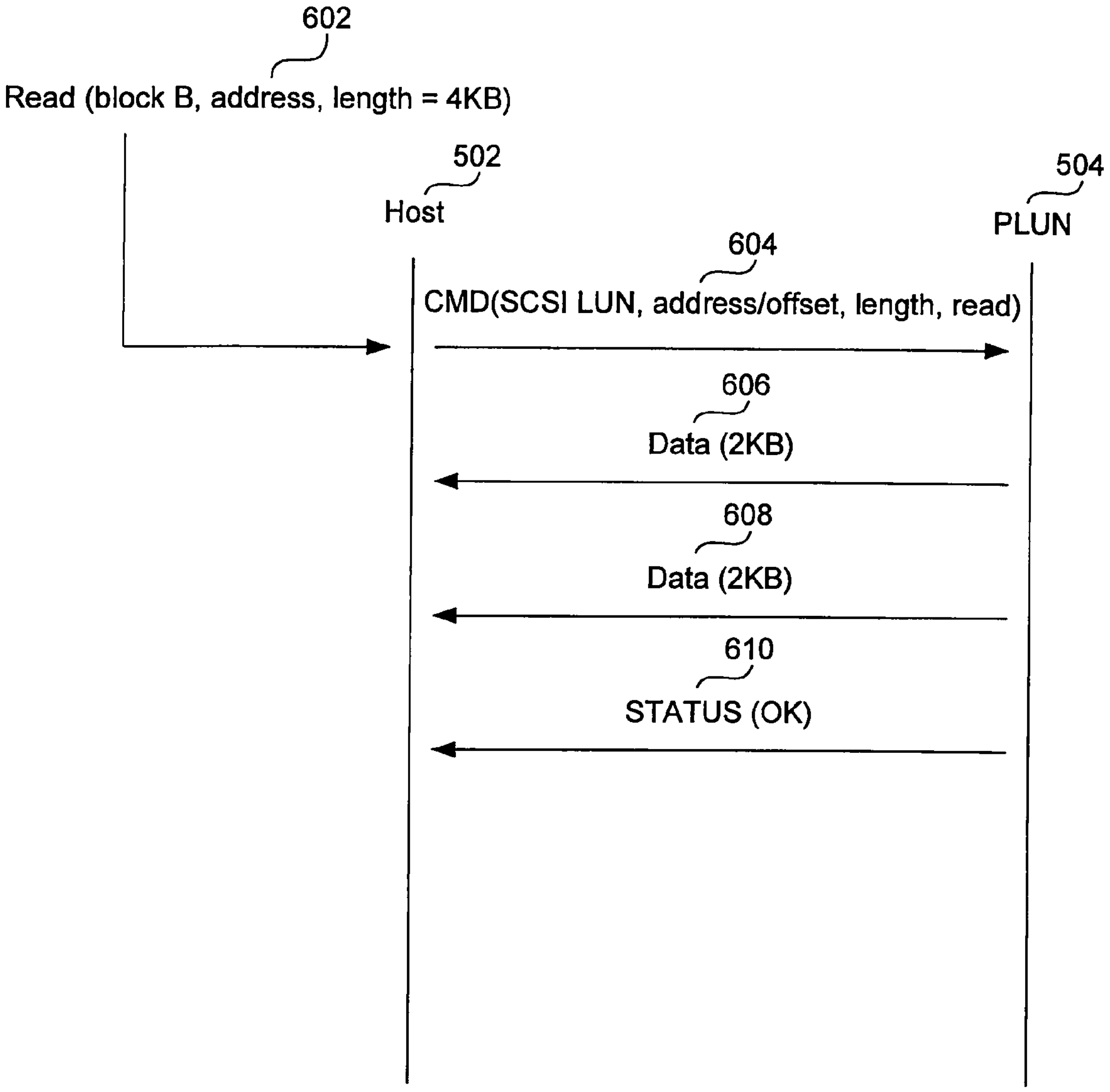
FIG. 6 is an exemplary transaction flow diagram illustrating a conventional SCSI read operation.

Similarly, steps performed during a conventional SCSI read operation are presented in FIG. 6. When a client wishes to read a specified amount of data from a physical address, the client sends a write command 602. As indicated above, the receipt of the read command by the host 502 triggers a SCSI exchange. The host 502 then sends a SCSI read command 604 indicating the physical LUN, physical address (i.e., offset), length, and indicates that this command is a read command rather than a write command. The PLUN 504 then responds with two sequential frames 606, 608 that each include 2 KB of data. Assuming that the read operation was successful, the PLUN 504 sends a STATUS(OK) message 610 to the host 504.

In order to support virtualization of storage within a storage area network, SCSI messages (e.g., frames) are intercepted by a virtualization enabled device, referred to herein as a virtualization switch. The virtualization switch preferably generates or modifies the received SCSI frames such that virtualization is transparent to both the host (e.g., initiator) and the physical LUNs (e.g., targets). In other words, the hosts and physical storage devices need not be modified to support the disclosed embodiments of the invention.

Figure 7:
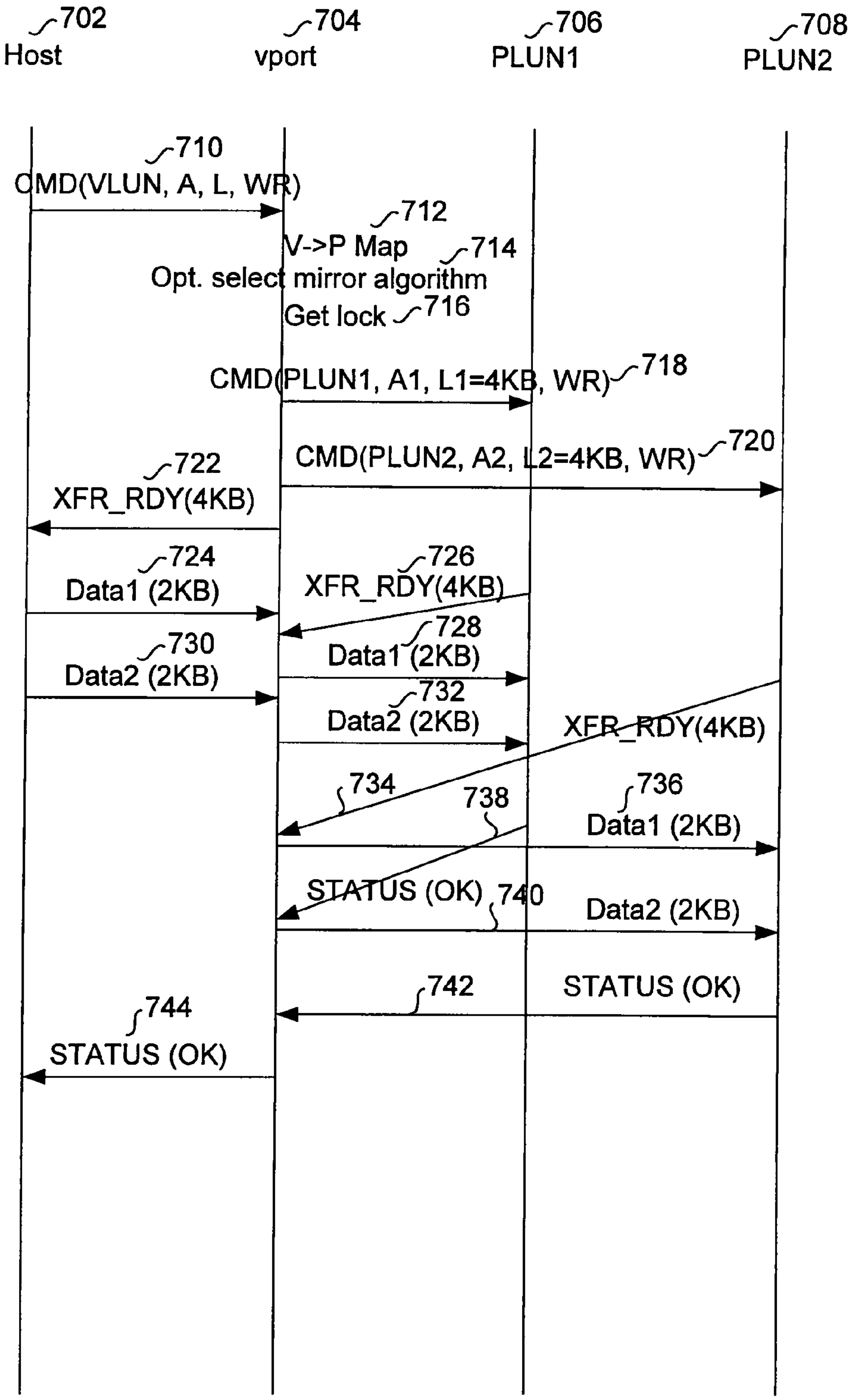
FIG. 7 is a transaction flow diagram illustrating an exemplary SCSI write operation performed in accordance with one embodiment of the invention.
Figure 8:
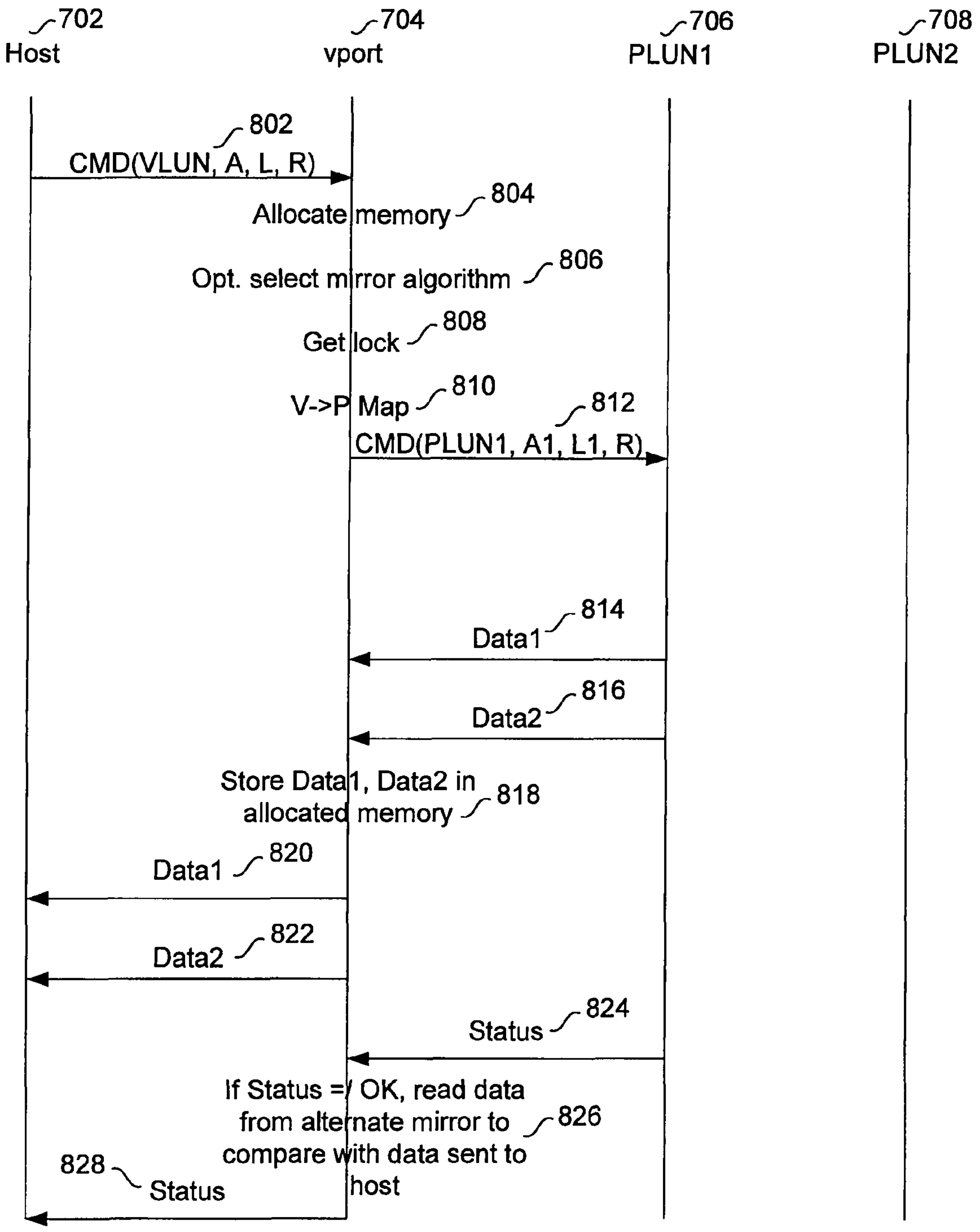
FIG. 8 is a transaction flow diagram illustrating an exemplary SCSI read operation performed in accordance with one embodiment of the invention.

In accordance with various embodiments of the invention, a virtualization switch supports storage virtualization within a storage area network. FIG. 7 illustrates application of storage virtualization to perform a SCSI write operation, while FIG. 8 illustrates application of storage virtualization to perform a SCSI read operation, both of which will be described in further detail below.

FIG. 7 is a transaction flow diagram illustrating an exemplary SCSI write operation performed in accordance with one embodiment of the invention. The host 702, virtualization port 704, physical LUN1 706, and physical LUN2 708 are represented by vertical lines as shown. In this example, data is mirrored in the two physical LUNs. As shown, the host 702 sends a WRITE command 710 identifying a virtual LUN, an address within the virtual LUN, length of data to be written (e,g., 4 KB), and indicates that the command is a write command. When the virtualization port 704 intercepts the WRITE command, it obtains a virtual-physical mapping 712 to identify one or more physical LUNs and associated physical addresses specified by the virtual-physical mapping (e.g., associated with the virtual LUN and virtual address). In addition, when data is to be mirrored, the virtualization port may perform a mirror select algorithm 714 indicating which physical LUN is to be written to first. For instance, the algorithm may operate in a random or round robin order. The virtualization port then obtains a lock 716 so that it may begin data transfer to both physical LUNS 706 and 708.

Once the virtualization port 704 obtains the lock, it sends a WRITE command to the first physical LUN as shown at 718 and to the second physical LUN as shown at 720. Each frame identifies the physical LUN, a physical address within the physical LUN, the length of the memory required (e.g., 4 KB) and indicates that the commands are WRITE commands. It is important to note that that the frames sent by the virtualization port are compatible with the standard protocol (e.g., type of traffic) of the frame received by the virtualization port from the initiator. In this example, since the data is mirrored, there are multiple WRITE commands that are sent by the virtualization port upon receipt of a single WRITE command by the virtualization port from an initiator. Thus, although it is possible for the virtualization port to modify a received frame for transmission, in this example, the virtualization port must also generate at least one new frame for transmission.

As described above, when a SCSI WRITE command is received by a target, the target typically sends a XFR_RDY signal when it is ready to receive a transfer of data from an initiator. Thus, it is also desirable to transmit a XFR_RDY signal from the virtualization port to the initiator (host). However, in accordance with one embodiment of the invention, a XFR_RDY signal 722 is sent by the virtualization port 704 to the host 702 prior to the receipt of a corresponding XFR_RDY signal from either of the physical LUNs. In this manner, the virtualization port 704 may obtain the data to be transferred before the physical LUNs are ready to receive the data. Thus, as soon as the XFR_RDY signal is received from one of the physical LUNs, the data may be immediately sent to the signaling physical LUN.

For instance, as shown, once the XFR_RDY signal 722 is received by the host 702 indicating that the virtual LUN is ready to receive 4 KB of data, the host 702 transfers the 4 KB data in two consecutive frames 724 and 730, each containing 2 KB of data. After the first frame 724 is sent to the virtualization port 704, a XFR_RDY signal 726 is received from the first physical LUN 706. Thus, transmission of data from the virtualization port 704 to the first physical LUN may be initiated immediately by sending a first frame of data to the first physical LUN at 728. Similarly, as soon as the second frame of data 730 is received from the host 702 by the virtualization port 704, the virtualization port 704 sends a second data frame 732 to the first physical LUN 706. Similarly, as soon as a XFR_RDY message 734 is received from the second physical LUN 708 indicating that it is ready to receive the entire 4 KB of data, the data is transmitted to the second physical LUN 708 in two frames 736, 740. During this time, the virtualization port 704 may receive a STATUS (OK) message 738 from the first physical LUN 738. Similarly, upon successful completion of the transfer of data to the second physical LUN 708, the second virtual LUN 708 will send a STATUS (OK) message 742 to the virtualization port. The virtualization port 704 then sends a single STATUS (OK) message 744 to the host 702 indicating that the data was successfully stored in memory. Of course, if the status indicates that the command was unsuccessful, one or more frames may be re-sent to the appropriate physical LUN(s). Accordingly, the mirroring operation requiring duplicate write operations to the physical LUNs is transparent to the host 702.

Once data is mirrored in two or more physical LUNs as described above with reference to FIG. 7, a SCSI read operation will trigger a read of data from one of the mirrors. FIG. 8 is a transaction flow diagram illustrating an exemplary SCSI read operation performed in accordance with one embodiment of the invention. As shown, the host 702 sends a SCSI read command 802 to a virtualization port 704, wherein the read command identifies a virtual LUN, an associated virtual address, length of data to be obtained, and indicates that the command is a read operation (rather than a write operation). The receipt of the read command by the virtualization port 704 triggers several operations that are performed by the virtualization port 704. More specifically, the virtualization port may allocate memory 804 to store data received by it. For instance, it may be desirable to allocate the amount of memory to be read from (or written to). This may be important for several reasons. For instance, data received at the virtualization port may be received in an order inconsistent with the order in which the data should be transmitted to the initiator of the read operation. Moreover, if the read operation has failed, it may be desirable to retain the data to ensure the integrity of data previously sent to the host. This may be accomplished, for instance, by reading data from an alternate mirror for comparison with the previously sent data.

Prior to reading data from one of a plurality of mirrors (e.g., physical LUNs), a mirror selection algorithm 806 may be implemented by the virtualization port 704 to select one of several mirrors from which to read the data. As described above, the data stored in each of the mirrors should reflect (e.g., duplicate) the data stored in the other mirrors. The mirror selection algorithm may, for example, randomly select one of the mirrors or select a preferred mirror (e.g., physical LUN1) from which to read data.

As described above with reference to the virtualization write command, a lock is obtained at 808 to ensure exclusive access to the specified memory locations. In addition, a virtual-physical mapping is obtained at 810. The virtualization port 704 then sends a read command 812 to the selected mirror, physical LUN1 706. Similarly to the write virtualization operation described above with reference to FIG. 7, the command specifies the physical LUN (e.g., PLUN1) and associated physical address, length of data to be read, and indicates that the operation is a read operation. As described above with reference to FIG. 7, a large block of data may need to be sent in two or more frames. Thus, PLUN1 706 replies to the virtualization port with the requested data in two separate frames 814 and 816. The virtualization port 704 may then store the data in the previously allocated memory at 818. The data may then be sent by the virtualization port 704 to the host 702 in two separate frames 820 and 822. When the STATUS 824 is received by the virtualization port 704 from PLUN1 706, the virtualization port 704 may determine whether a command and/or data needs to be re-transmitted at 826. In other words, if the STATUS indicates that the operation was not successful, it may be desirable to read data from an alternate mirror (e.g., physical LUN) to compare the data with that previously sent to the host (and stored in the allocated memory). The STATUS 828 may then be transmitted to the host 702. For instance, the virtualization port 704 may wait until the command has been successfully completed before sending a status to the host.

Figure 9A:
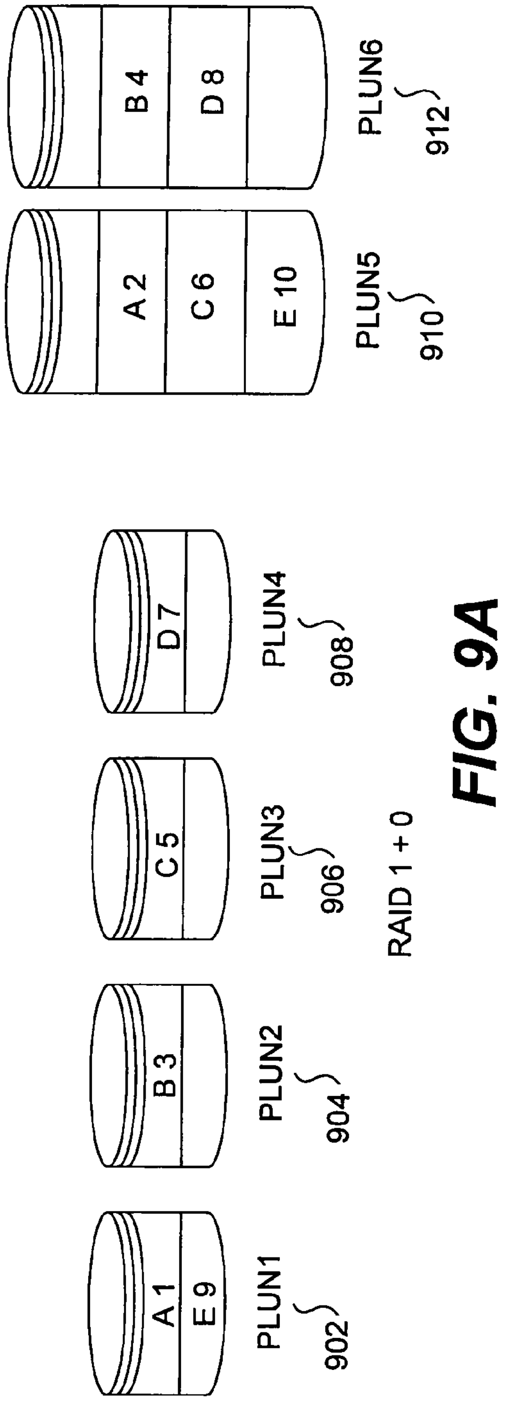
FIG. 9A is an exemplary block diagram illustrating an exemplary storage configuration resulting from application of a RAID 1+0 operation performed in accordance with one embodiment of the invention.

The present invention may be applied to accomplish a variety of virtualization operations, including mirroring and striping. For instance, a RAID 1+0 operation comprises a mirror operation followed by a striping operation. FIG. 9A is an exemplary block diagram illustrating an exemplary storage configuration resulting from application of a RAID 1+0 operation performed in accordance with one embodiment of the invention. As shown, multiple physical LUNs are illustrated in which data A-E is stored in blocks of data. More specifically, the data is stored in the order shown by the corresponding numbers 1-10. The RAID 1+0 operation is performed such that the data is stored in physical LUNs PLUN1 902, PLUN2 904, PLUN3 906, and PLUN4 908 as well as mirrored in physical LUNs PLUN5 910 and PLUN6 912. Since mirroring is performed first, each block of data is mirrored in the physical LUNs PLUN5 910 and PLUN6 912 prior to striping the block of data. In other words, a single portion of data is mirrored in multiple physical LUNs prior to "striping" the entire block of data across the mirrors. In this example, data A is stored in LUN 902 then mirrored in LUN 910. Data B is then stored in LUN 904 and mirrored in LUN 912, which creates a "stripe" across the LUNs as shown. Consecutive mirroring and striping operations are performed to store data C, D, and E as shown.

Figure 9B:
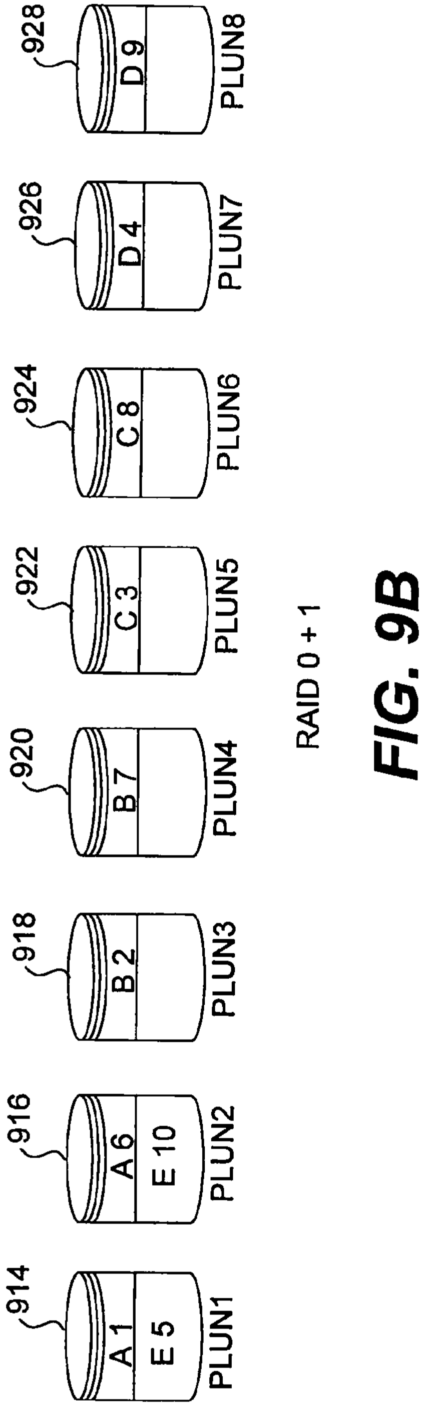
FIG. 9B is an exemplary block diagram illustrating an exemplary storage configuration resulting from application of a RAID 0+1 operation performed in accordance with one embodiment of the invention.

As another example, a RAID 0+1 operation, may be performed which comprises a striping operation followed by a mirror operation. FIG. 9B is an exemplary block diagram illustrating an exemplary storage configuration resulting from application of a RAID 0+1 operation performed in accordance with one embodiment of the invention. As shown, multiple physical LUNs are illustrated in which data A-E is stored in blocks of data. More specifically, the data is stored in the order indicated by the corresponding numbers 1-10. The RAID 0+1 operation is performed such that the data is stored in physical LUNs PLUN1 914, PLUN3 918, PLUN5 922, and PLUN7 926 as well as mirrored in physical LUNs PLUN2 916, PLUN4 920, PLUN6 924, and PLUN8 928. Since striping is performed first, all blocks of data are "striped" across the physical LUNS prior to mirroring a single block of data in multiple physical LUNs, as shown. In this example, the entire set of data A-E is striped across the physical LUNS 914, 918, 922, 926, and 914 as shown by numbers 1-5. Then, each portion of data A, B, C, D, and E is individually mirrored in the physical LUNs 916, 920, 924, 928, and 916, respectively, as indicated by corresponding numbers 6-10.

Figure 10A:
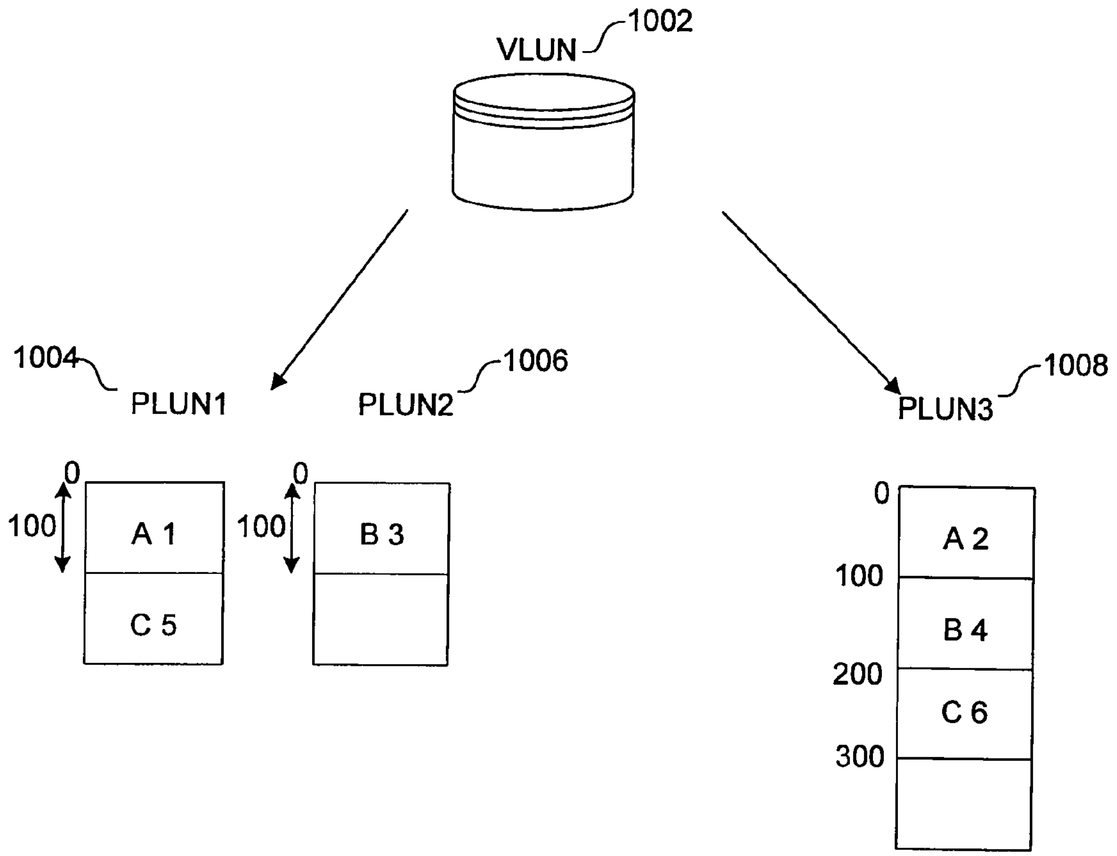
FIG. 10A is another exemplary block diagram illustrating an exemplary storage configuration resulting from application of a RAID 1+0 operation performed in accordance with one embodiment of the invention, in which mirroring is followed by striping.

FIG. 10A is another exemplary block diagram illustrating an exemplary storage configuration resulting from application of a RAID 1+0 operation performed in accordance with one embodiment of the invention. As described above, a RAID 1+0 operation comprises mirroring followed by striping steps. As shown, a virtual LUN 1002 may represent three physical LUNs, PLUN1 1004, PLUN2 1006, and PLUN3 1008. As shown, the physical LUNs may be heterogeneous, and may therefore comprise different amounts of memory. In this example, each block of data A, B, and C is 100 bytes. The data is mirrored and striped in the order represented by the numbers 1-6. As shown, each block of data is individually mirrored in PLUN3 1008. During this process, the data A-C is striped across PLUNs 1004 and 1006.

Figure 10B:
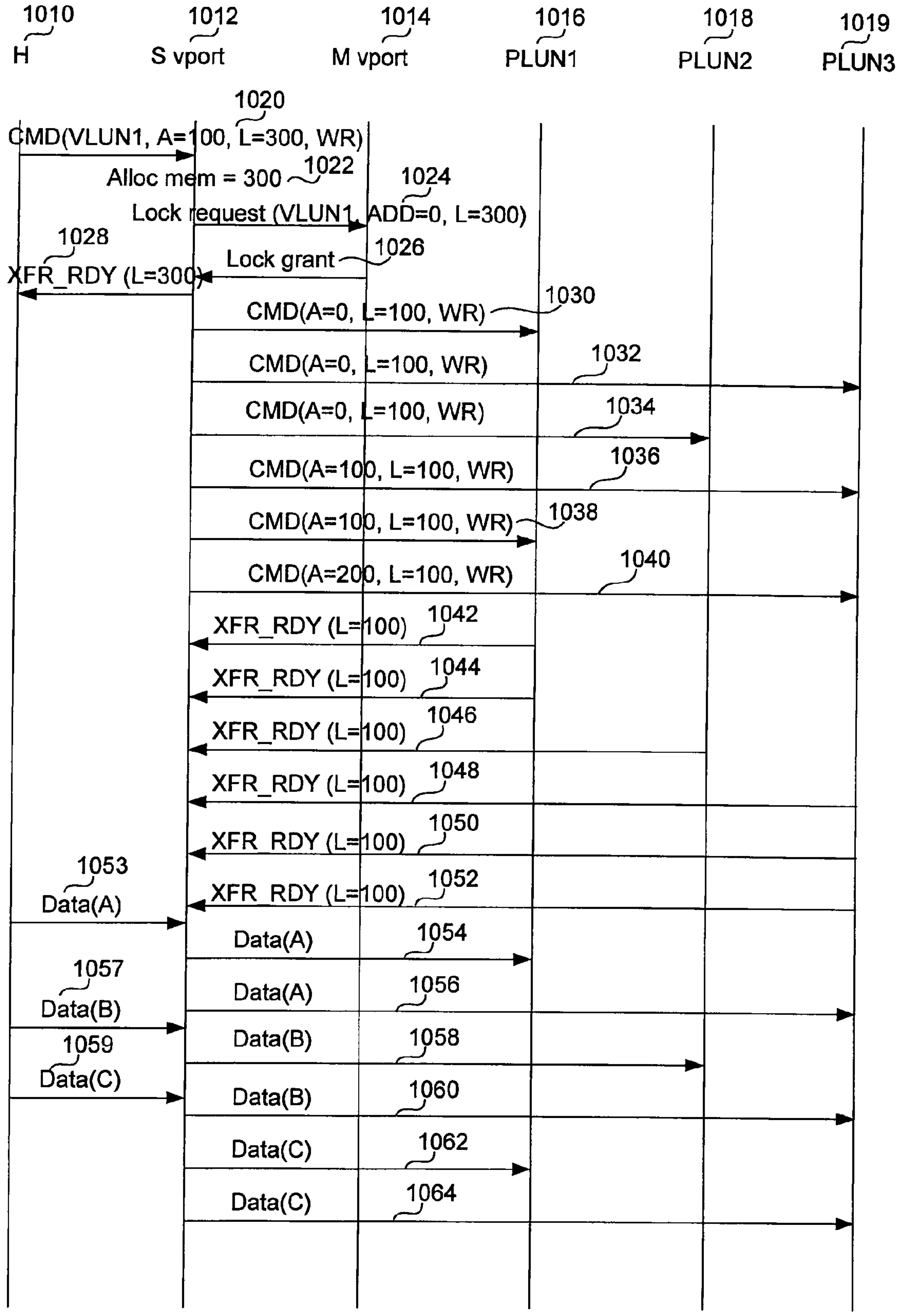
FIGS. 10B and 10C together represent a transaction flow diagram representing the steps performed during the RAID 1+0 operation of FIG. 10A.
Figure 10C:
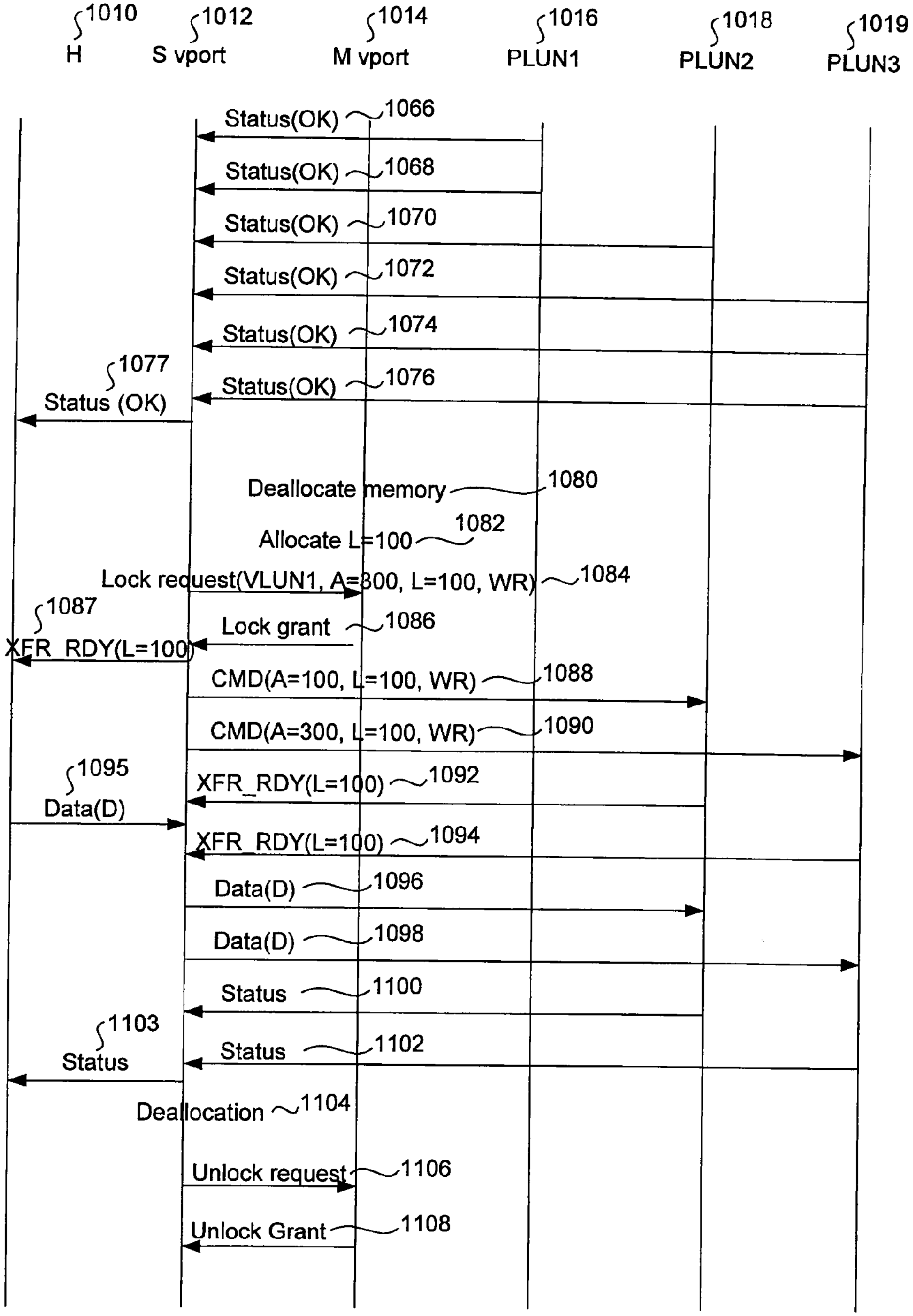

FIGS. 10B and 10C together represent a transaction flow diagram representing the steps performed during the RAID 1+0 operation of FIG. 10A, in which mirroring is followed by striping. As shown, steps performed by the host, slave virtualization port, master virtualization port, and physical LUNs PLUN1-PLUN3 are represented by vertical lines 1010, 1012, 1014, 1016, 1018, and 1019, respectively. The host 1010 first sends a write command as shown at 1020 indicating a virtual LUN (e.g., VLUN1), an address within the virtual LUN (e.g., 0), a length of data to be transferred (e.g., 300 bytes), and indicates that the command is a write command. When the virtualization port 1012 receives the command, it may allocate memory 1022 for the data to be written, as described above with reference to the read command.

As described above, if the virtualization port is not the master port, it obtains a lock from the master port prior to accessing the virtual LUN. Thus, the slave virtualization port 1012 sends a lock request 1024 to the master virtualization port 1014. For instance, the lock request may serve to request access to the virtual LUN at the specified address, as well as indicate the amount of memory to be locked. When the lock grant 1026 is received from the master virtualization port 1014, the slave virtualization port 1012 may wish to send a XFR_RDY signal 1028 to the host 1010 to optimize the virtualization process.

The virtualization port 1012 then sends write commands to the three PLUNs in the order in which data is to be sent, as shown in FIG. 10A. More specifically, data A is to be stored in PLUN1 at address 0, followed by PLUN3 at address 0. Thus, corresponding write commands 1030 and 1032 are sent to PLUN1 1016 and PLUN3 1019, both commands indicating that 100 bytes of data are to be written at physical address 0 within the corresponding physical LUN. Similarly, write commands 1034 and 1036 correspond to the mirroring of data B in PLUN2 and PLUN3, indicating that the 100 bytes of data are to be written at addresses 0 and 100, respectively, as illustrated in FIG. 10A. Write commands 1038 and 1040 are then sent to PLUN1 1016 and PLUN3 1019 corresponding to data C which indicate the amount of data to be transferred and the physical addresses, 100 and 200, respectively, at which the data is to be stored in the physical LUNs. Transfer ready signals 1042-1052 corresponding to each write command are sent by PLUN1, PLUN2, and PLUN3, respectively, as the physical LUNs are ready to receive the transfer of data.

In the example described above, each write command and associated XFR_RDY command are illustrated. However, memory is allocated at 1022 and therefore data is buffered on the virtualization port. As a result, the writing of data such as A1-C5 and of data A2-B4-C6 as shown in FIG. 10A (and associated XFR_RDY command) may be merged into a single step rather than be performed separately, as described above. For instance, steps 1030 and 1038 may be merged into a single write of 200 bytes, and steps 1032, 1036, and 1040 may be merged into a single write of 300 bytes. Similarly, steps 1042 and 1044 may be merged into a single XFR_RDY command from PLUN1 of 200 bytes, and steps 1048, 1050, and 1052 may be merged into a single XFR_RDY command from PLUN3 of 300 bytes.

Since XFR_RDY signals have been received, the virtualization port 1012 may begin sending data to the corresponding physical LUNs as soon as the data is received from the host 1010. Thus, when data A is received from the host at 1053, the data is sent to PLUN1 1016 at 1054 and to PLUN3 1019 at 1056. Similarly, when data B is received from the host, it may be sent to both PLUN2 1018 and PLUN3 1019, as shown at 1058 and 1060, respectively. During this time, data C may be received from the host 1010 as shown at 1059. Data C is then sent to PLUN1 and PLUN3 as shown at 1062 and 1064, respectively. Assuming that the write commands were successful, STATUS (OK) messages 1066-1076 are received from PLUN 1, PLUN2, and PLUN3, respectively. A STATUS (OK) message 1077 is then returned to the host. The allocated memory may be de-allocated at 1080 upon notification that the command has been successfully completed.

There may be a maximum transfer unit due to a variety of constraints within the system. For instance, the virtualization port may have a limited amount of memory to allocate for a particular transfer. Modifying the example illustrated in FIG. 10B, the host may have initially requested 400 bytes of memory to send data A through D (rather than 300 bytes of memory as shown), while the virtualization port may have only 300 bytes available for allocation. Thus, the virtualization port may send a XFR_RDY message indicating that only 300 bytes may be transferred, as described above. In this instance, as soon as the memory is de-allocated, the remaining 100 bytes of memory is allocated by the virtualization port at 1082. A second lock request may, for instance, identify the virtual LUN, an address within the virtual LUN, a length of data to be written (100 bytes), and indicate that data is to be written to the VLUN. When the lock is granted at 1086, a transfer ready signal 1087 is sent to the host indicating that the remaining 100 bytes of data may be transferred. Similarly, write commands to PLUN2 1018 and PLUN3 1019 are sent at 1088 and 1090, respectively, indicating the physical addresses and amount of memory required for the write operations. When transfer ready signals are received from the corresponding physical LUNs as shown at 1092 and 1094, data D received at 1095 from the host is sent to the two physical LUNs at 1096 and 1098. Upon receipt of a status from the two physical LUNs as shown at 1100 and 1102, an appropriate status is sent at 1103 to the host. Again, upon successful completion of the command, memory is de-allocated at 1104.

Once a lock has been granted by a "master port" within the storage area network, the lock may be "released" when no longer needed. Upon release, another network entity or process may access the virtual LUN, and therefore the corresponding physical LUN(s). For instance, a lock release or unlock request 1106 may be sent by the slave virtualization port to the master virtualization port when the write (or read) command has been successfully completed. As described above, the successful completion of a command may be indicated upon receipt of the STATUS from the corresponding target(s). A notification that the granted lock has been released may then be provided by the master virtualization port to the slave virtualization port at 1108.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being applied to frames. However, it should be understood that the invention is not limited to such implementations, but instead would equally apply to packets as well. Moreover, the present invention would apply regardless of the context and system in which it is implemented. Thus, broadly speaking, the present invention need not be performed using the virtualization operations described above, but may be used to support other virtualization operations in a storage area network.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. A method, comprising:

(a) receiving a frame or packet at a port of a network device, wherein the network device is a switch, router, iSCSI gateway, or other network node configured to perform a switching function, the frame or packet comprises a read or write command;

(b) determining by the port that the frame or packet pertains to access of a virtual storage location of a virtual storage unit representing one or more physical storage locations on one or more physical storage units of a storage area network, wherein the virtual storage unit comprises a virtual logical unit (VLUN) or other virtual representation of storage on the storage area network;

(c) obtaining by the port a virtual-physical mapping between the one or more physical storage locations and the virtual storage location;

(d) sending by the port a new or modified frame or packet to an initiator or a target specified by the virtual-physical mapping, the initiator or the target are storage devices;

(e) requesting, by the port, a lock of the one or more physical storage locations by said port of the network device, requesting the lock indicates allocation of an amount of memory to be read or written at the storage device; and (f) releasing, by the port, the lock upon receiving a status from the target, the status indicates a completion of transferring data from the port to the initiator or the target, releasing the lock indicates de-allocation of the allocated amount of the memory at the storage device.

2. The method as recited in claim 1, wherein the frame or packet is a read or write command.

3. The method as recited in claim 1, wherein requesting is performed via a master port, the master port being the port of the network device, a second port of the network device, or a port of another network device, the another network device being a switch, router, iSCSI gateway, or other network node configured to perform a switching function, wherein the master port is responsible for managing lock requests.

4. The method of claim 3, the method further comprising:

sending a lock request, by the port of the network device, to a single master port of a network device within the storage area network, wherein the single master port is configured for managing lock requests and providing notification upon successful grant of the lock requests.

5. The method of claim 3, wherein the master port is one of a set of ports, wherein another one of the set of ports replaces the master port in the event of a failure of the master port.

6. The method of claim 3, wherein the master port is further configured for providing notification upon successful grant of the lock requests, the method further comprising:

receiving a message from the master port, the message indicating whether the lock of the one or more physical storage locations has been granted.

7. The method of claim 3, wherein the master port is a single port within the storage area network that is responsible for managing lock requests that are sent from various devices within the storage area network.

8. The method as recited in claim 1, wherein (b), (c), (d), (e), and (f) are performed by logic that is dedicated to only said port of the network device.

9. The method as recited in claim 1, wherein (b), (c), (d), (e), and (f) are performed by a dedicated processor that is dedicated to only said port of the network device.

10. The method as recited in claim 1, wherein determining that the frame or packet pertains to access of a virtual storage location comprises identifying an address of the virtual storage unit in the frame or packet from the initiator.

11. The method as recited in claim 10, wherein the address is a destination address.

12. The method as recited in claim 1, wherein determining that the frame or packet pertains to access of a virtual storage location comprises identifying an address of the port in a destination address field of the frame or packet from the target.

13. The method as recited in claim 1, wherein the virtual-physical mapping is defined by a virtualization model.

14. The method as recited in claim 1, the method further comprising:

generating one or more new packets or frames or modifying the received packet or frame in a manner that replaces a destination address of the virtual storage unit with one or more destination addresses of the one or more physical storage units.

15. The method as recited in claim 1, the method further comprising:

generating a new packet or frame or modifying the received packet or frame in a manner that replaces a source address of a physical storage unit with a source address of the virtual storage unit.

16. The method as recited in claim 1, the method further comprising:

generating a new packet or frame or modifying the received packet or frame in a manner that replaces a source address of the initiator with an address of the port on the network device.

17. The method as recited in claim 1, wherein the frame or packet received at a port of the network device comprises a read or write command, the method further comprising:

receiving a transfer ready signal from the target after the sending of the new or modified frame or packet, the transfer ready signal indicating that the target is ready to receive a transfer of data.

18. The method as recited in claim 17, further comprising:

sending a transfer ready signal to the initiator after the sending of the new or modified frame or packet, the transfer ready signal indicating that the network device is ready to receive a transfer of data from the initiator;

wherein sending the transfer ready signal to the initiator is performed prior to receiving a transfer ready signal from the target.

19. The method as recited in claim 1, wherein the frame or packet received at a port of the network device comprises a read or write command, the method further comprising:

receiving a status after the sending of the new or modified frame or packet, the status indicating whether the command was successful.

20. The method as recited in claim 19, further comprising: sending the status to the initiator.

21. The method as recited in claim 19, further comprising: sending a second new or modified frame or packet to an initiator or a target specified by the virtual-physical mapping;

receiving a second status after the sending of the second new or modified frame or packet, the second status indicating whether the command was successful;

merging the status and the second status; and sending the merged status to the initiator.

22. The method as recited in claim 19, further comprising: determining from the status whether the command was successful; and re-sending the new or modified frame or packet when it is determined that the command was not successful.

23. The method as recited in claim 22, further comprising: sending the status to the initiator when it is determined that the command was successful.

24. The method as recited in claim 22, wherein the new or modified frame or packet comprises data.

25. The method as recited in claim 22, wherein the new or modified frame or packet comprises a read or write command.

26. The method as recited in claim 22, wherein the frame or packet received at a port of the network device comprises data, the method further comprising:

storing the data in a memory location;

wherein re-sending the new or modified frame or packet comprises:

obtaining the data from the memory location; and sending a new or modified frame or packet including the obtained data to the initiator or the target specified by the virtual-physical mapping.

27. The method as recited in claim 22, further comprising: receiving data from the target specified by the virtual-physical mapping; and storing the data in a memory location.

28. The method as recited in claim 27, wherein re-sending the new or modified frame or packet comprises:

obtaining the data from the memory location; and sending a new or modified frame or packet including the obtained data to the initiator specified by the virtual-physical mapping.

29. The method as recited in claim 27, wherein re-sending the new or modified frame or packet comprises sending the new or modified frame or packet to an alternate target specified by the virtual-physical mapping, the method further comprising:

receiving alternate data from the alternate target specified by the virtual-physical mapping; and comparing the alternate data with the data stored in the memory location.

30. The method as recited in claim 29, further comprising: employing a mirror algorithm to select the alternate target.

31. The method as recited in claim 1, wherein the frame or packet received at the port of the network device comprises a SCSI read command and the new or modified frame or packet sent by the network device comprises a SCSI read command.

32. The method as recited in claim 1, wherein the frame or packet received at the port of the network device comprises a SCSI write command and the new or modified frame or packet sent by the network device comprises a SCSI write command.

33. The method of claim 1, wherein receiving a frame or packet at a port of a network device comprises receiving a frame or packet from an initiator, and wherein sending by the port a new or modified frame or packet comprises sending a new or modified frame or packet to a target specified by the virtual-physical mapping.

34. The method of claim 1, wherein receiving a frame or packet at a port of a network device comprises receiving a frame or packet from a target, and wherein sending by the port a new or modified frame or packet comprises sending a new or modified frame or packet to an initiator specified by the virtual-physical mapping.

35. The method of claim 1, wherein the master port is a port of another switch, router, iSCSI gateway, or other network node configured to perform a switching function.

36. The method of claim 1, wherein the network device is separate from the one or more physical storage units of the storage area network.

37. A method, comprising:

(a) receiving a frame or packet at a port of a network device, wherein the network device is a switch, router, iSCSI gateway, or other network node configured to perform a switching function, the frame or packet comprises a read or write command;

(b) obtaining information by the port from the frame or packet pertaining to access of data stored in one or more physical locations on one or more physical storage units of a storage area network, the information identifying one or more of the physical locations or a virtual storage location of a virtual storage unit, the virtual storage location representing the one or more physical storage locations, wherein the virtual storage unit comprises a virtual logical unit (VLUN) or other virtual representation of storage on the storage area network;

(c) obtaining by the port a virtual-physical mapping between the one or more physical storage locations and the virtual storage location;

(d) sending by the port a new or modified frame or packet to an identity specified by the virtual-physical mapping, the initiator or the target are storage devices;

(e) requesting by the port a lock of the one or more physical storage locations by said port of the network device, requesting the lock indicates allocation of an amount of memory to be read or written at the storage device; and (f) releasing by the port the lock upon receiving a status from the target, the status indicates a completion of transferring data from the port to the target, releasing the lock indicates de-allocation of the allocated amount of the memory at the storage device.

38. The method as recited in claim 37, wherein (b), (c), (d), (e) and (f) are performed by a dedicated processor that is dedicated to only said port of the network device.

39. The method as recited in claim 37, wherein requesting a lock is performed via a master port, wherein the master port is a port of a switch, router, iSCSI gateway, or other network node configured to perform a switching function, wherein the master port is responsible for managing lock requests.

40. The method as recited in claim 39, wherein requesting the lock of the one or more physical storage locations comprises sending a lock request, by the port of the network device, to a single master port of a network device within the storage area network, the single master port being responsible for managing lock requests and providing notification upon successful grant of the lock requests.

41. A network device, comprising:

means for receiving a frame or packet at a port of the network device, wherein the network device is a switch, router, iSCSI gateway, or other network node configured to perform a switching function, the frame or packet comprises a read or write command;

means for determining by the port that the frame or packet pertains to access of a virtual storage location of a virtual storage unit representing one or more physical storage locations on one or more physical storage units of a storage area network, wherein the virtual storage unit comprises a virtual logical unit (VLUN) or other virtual representation of storage on the storage area network;

means for obtaining by the port a virtual-physical mapping between the one or more physical storage locations and the virtual storage location;

means for sending by the port a new or modified frame or packet to an initiator or a target specified by the virtual-physical mappine the initiator or the target are storage devices;

means for requesting by the port a lock of the one or more physical storage locations by said port of the network device, requesting the lock indicates allocation of an amount of memory to be read or written at the storage device; and means for releasing the lock by the port upon receiving a status from the target, the status indicates a completion of transferring data from the port to the target, releasing the lock indicates de-allocation of the allocated amount of the memory at the storage device.

42. An apparatus, comprising:

a processor; and a memory, at least one of the processor or the memory being adapted for causing one of a plurality of ports of the apparatus to perform the following steps:

(a) receiving a frame or packet at the one of the plurality of ports of the apparatus, wherein the apparatus is a switch, router, iSCSI gateway, or other network node configured to perform a switching function, the frame or packet comprises a read or write command;

(b) obtaining information by the one of the plurality of ports from the frame or packet pertaining to access of data stored in one or more physical locations on one or more physical storage units of a storage area network, the information identifying one or more of the physical locations or a virtual storage location of a virtual storage unit, the virtual storage location representing the one or more physical storage locations, wherein the virtual storage unit comprises a virtual logical unit (VLUN) or other virtual representation of storage on the storage area network;

(c) obtaining by the one of the plurality of ports a virtual-physical mapping between the one or more physical storage locations and the virtual storage location;

(d) sending by the one of the plurality of ports a new or modified frame or packet to an identity specified by the virtual-physical mapping, the initiator or the target are storage devices;

(e) requesting by the port a lock of the one or more physical storage locations by the one of the plurality of ports of the network device, requesting the lock indicates allocation of an amount of memory to be read or written at the storage device; and (f) releasing by the port the lock upon receiving a status from the target, the status indicates a completion of transferring data from the part to the target, releasing the lock indicates de-allocation of the allocated amount of the memory at the storage device.

43. The apparatus of claim 42, wherein (b), (c), (d), (e) and (f) are performed by logic that is dedicated to only the one of the plurality of ports of the network device.

44. The apparatus of claim 42, wherein (b), (c), (d), (e) and (f) are performed by the processor, wherein the processor is dedicated to only the one of the plurality of ports.

45. The apparatus of claim 42, wherein a second one of the plurality of ports of the apparatus is configured to perform steps (b), (c), (d), (e) and (f) for packets received by the second one of the plurality of ports.

46. The apparatus of claim 45, wherein the second one of the plurality of ports is configured to perform steps (b), (c), (d), (e) and (f) by logic that is dedicated to only the second one of the plurality of ports of the network device.

47. The apparatus of claim 45, wherein the second one of the plurality of ports is configured to perform steps (b), (c), (d), (e) and (f) by a second processor, wherein the second processor is dedicated to only the second one of the plurality of ports.

48. The apparatus of claim 42, wherein requesting is performed via a master port, wherein the master port is a port of a switch, router, iSCSI gateway, or other network node configured to perform a switching function, wherein the master port is responsible for managing lock requests.

49. A method, comprising:

(a) receiving a frame or packet at a port of one of a plurality of network devices from a host, wherein each of the plurality of network device is a switch, router, iSCSI gateway, or other network node configured to perform a switching function, the frame or packet comprises a read or write command;

(b) determining by the port that the frame or packet pertains to access of a virtual storage location of a virtual storage unit representing one or more physical storage locations on one or more of a plurality of physical storage units of a storage area network, wherein the virtual storage unit comprises a virtual logical unit (VLUN) or other virtual representation of storage on the storage area network;

(c) obtaining by the port a virtual-physical mapping between the one or more physical storage locations and the virtual storage location;

(d) sending by the port a new or modified frame or packet to an initiator or a target specified by the virtual-physical mapping, the initiator or the target are storage devices;

(e) requesting by the port a lock of the one or more physical storage locations by said port of the network device, requesting the lock indicates allocation of an amount of memory to be read or written at the storage device; and (f) releasing by the port the lock upon receiving a status from the target, the status indicates a completion of transferring data from the port to the target, releasing the lock indicates de-allocation of the allocated amount of the memory at the storage device.

50. The method of claim 49, wherein multiple ports among ports of the plurality of network devices are configured for performing the steps of (a), (b), (c), (d), (e) and (f).

* * * * *